(12) United States Patent
Torii et al.

(10) Patent No.: US 8,647,528 B2
(45) Date of Patent: Feb. 11, 2014

(54) WATER ABSORBING AGENT AND PRODUCTION METHOD THEREOF

(75) Inventors: Kazushi Torii, Hyogo (JP); Sayaka Machida, Hyogo (JP); Yoshifumi Adachi, Hyogo (JP); Hiroyuki Ikeuchi, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/808,066

(22) PCT Filed: Mar. 6, 2009

(86) PCT No.: PCT/JP2009/054828
§ 371 (c)(1),
(2), (4) Date: Jun. 14, 2010

(87) PCT Pub. No.: WO2009/110645
PCT Pub. Date: Sep. 11, 2009

(65) Prior Publication Data
US 2010/0270501 A1    Oct. 28, 2010

(30) Foreign Application Priority Data

Mar. 7, 2008    (JP) .................. 2008-057350

(51) Int. Cl.
*C09K 3/00* (2006.01)
*C08F 120/06* (2006.01)

(52) U.S. Cl.
USPC .......................................... 252/194; 525/178

(58) Field of Classification Search
USPC .......................................................... 252/194
See application file for complete search history.

(56) References Cited

U.S. PATENT DOCUMENTS

| | | | |
|---|---|---|---|
| 3,855,299 A * | 12/1974 | Witt | 564/476 |
| 3,930,877 A * | 1/1976 | Aitken | 106/287.22 |
| 4,268,352 A * | 5/1981 | Cosper et al. | 162/191 |
| 4,347,339 A * | 8/1982 | Boevink et al. | 525/180 |
| 5,382,610 A | 1/1995 | Harada et al. | |
| 5,384,368 A | 1/1995 | Date et al. | |
| 5,668,236 A | 9/1997 | Engelhardt et al. | |
| 5,797,893 A | 8/1998 | Wada et al. | |
| 5,843,575 A | 12/1998 | Wang et al. | |
| 5,849,405 A | 12/1998 | Wang et al. | |
| 5,851,672 A | 12/1998 | Wang et al. | |
| 5,858,535 A | 1/1999 | Wang et al. | |
| 6,099,950 A | 8/2000 | Wang et al. | |
| 6,299,936 B1 | 10/2001 | Reck et al. | |
| 6,348,530 B1 | 2/2002 | Reck et al. | |
| 2002/0128618 A1 | 9/2002 | Frenz et al. | |
| 2002/0185629 A1 | 12/2002 | Fujii et al. | |
| 2003/0069359 A1 | 4/2003 | Torii et al. | |
| 2004/0039360 A1 | 2/2004 | Ehrnsperger et al. | |
| 2004/0071966 A1 | 4/2004 | Inger et al. | |
| 2005/0020780 A1 | 1/2005 | Inger et al. | |
| 2005/0245684 A1 | 11/2005 | Daniel et al. | |
| 2006/0229413 A1 | 10/2006 | Torii et al. | |
| 2007/0134492 A1 | 6/2007 | Ehrnsperger et al. | |
| 2008/0221277 A1 | 9/2008 | Walden et al. | |
| 2008/0280128 A1 | 11/2008 | Furno et al. | |
| 2009/0105389 A1 | 4/2009 | Walden et al. | |
| 2009/0202805 A1 | 8/2009 | Furno et al. | |
| 2009/0227741 A1 | 9/2009 | Walden et al. | |

FOREIGN PATENT DOCUMENTS

| | | |
|---|---|---|
| DE | 19729161 | 1/1999 |
| DE | 19735959 | 2/1999 |
| EP | 0493011 | 7/1992 |
| EP | 0640330 | 3/1995 |
| EP | 0671418 | 9/1995 |
| EP | 0951913 | 10/1999 |
| EP | 1364992 | 11/2003 |
| JP | 2-248404 | 10/1990 |
| JP | 4-272910 | 9/1992 |
| JP | 2000-095955 | 4/2000 |
| JP | 2002-212301 | 7/2002 |
| JP | 2002-363340 | 12/2002 |
| JP | 2003-41136 | 2/2003 |
| WO | 95/26209 | 10/1995 |
| WO | 99/34841 | 7/1999 |
| WO | 03/043670 | 5/2003 |
| WO | 2004/069915 | 8/2004 |
| WO | 2006/082188 | 8/2006 |
| WO | 2006/082189 | 8/2006 |
| WO | 2006/082197 | 8/2006 |
| WO | 2008/025652 | 3/2008 |
| WO | 2008/025655 | 3/2008 |
| WO | 2008/025656 | 3/2008 |

OTHER PUBLICATIONS

Japanese Office Action dated Oct. 29, 2013, issued in corresponding Japanese Patent Application No. 2010-521254, and English translation.

* cited by examiner

*Primary Examiner* — Peter F Godenschwager
(74) *Attorney, Agent, or Firm* — Roylance, Abrams, Berdo & Goodman, L.L.P.

(57) ABSTRACT

The present invention provides a water absorbing agent that is excellent in a balance between a centrifugal retention capacity (CRC) and a saline flow conductivity (SFC), and a method for producing the water absorbing agent.

The method for producing the water absorbing agent, the method comprising mixing (i) a water absorbing resin (A) and (ii) a polymer (B) being a polyamine polymer having a hydroxyl group on a main chain provides a water absorbing agent containing (i) the water absorbing resin (A) and (ii) the polymer (B) being a polyamine polymer having a hydroxyl group on a main chain.

12 Claims, 1 Drawing Sheet

WATER ABSORBING AGENT AND PRODUCTION METHOD THEREOF

TECHNICAL FIELD

The present invention relates to a water absorbing agent and a method for producing the same. More specifically, the present invention provides (i) a novel water absorbing agent that is suitable for use in a sanitary material such as a disposable diaper, the water absorbing agent having improved water absorbing characteristics, and (ii) a method for producing the water absorbing agent. Particularly, the present invention provides (i) the water absorbing agent having improved absorption capacity, and improved fluid permeability under pressure despite of swelling gels swollen as a result of water absorption, and (ii) a method for producing the water absorbing agent.

BACKGROUND ART

In recent years, a water absorbing resin has been in widespread use, as a main constituent material of a water absorbent core for absorbing body fluids, in sanitary materials such as a disposable diaper, a sanitary napkin, and an incontinence pad, for the purpose of absorbing body fluids such as urine and blood.

Known as the above water absorbing resin are such as: a partially neutralized and crosslinked polyacrylic acid; a hydrolysate of starch-acrylonitrile-grafted polymer; a neutralized starch-acrylic acid-grafted polymer; a saponified vinyl acetate-acrylic acid ester copolymer; a crosslinked carboxymethylcellulose; a hydrolysate of acrylonitrile copolymer or a hydrolysate of acrylamide copolymer, or a crosslinked acrylonitrile copolymer or a crosslinked acrylamide copolymer; a crosslinked cationic monomer; an isobutylene-maleic acid crosslinked copolymer; and a crosslinked polymer of 2-acrylamide-2-methylpropanesulfonic acid and acrylic acid.

Water absorbing characteristics that have been conventionally required for the water absorbing resin are such as: high absorption capacity when the water absorbing resin contacts an aqueous liquid such as body fluid; excellent absorption speed; liquid permeability; gel strength of a swelling gel; and an amount of water that the water absorbing resin absorbs from a base material containing the aqueous liquid.

In recent years, sanitary materials such as disposable diapers have been more functionalized and made thinner. In order to make the sanitary materials thinner while increasing the absorbing amount and preventing liquid leakage, more water absorbing resin have been used, and a larger ratio of the water absorbing resin to an entire water absorbent core in the sanitary material have been used. Such a water absorbent core including an increased amount of water absorbing resin is preferable when keeping liquid therein is merely considered. However, actual use of the water absorbent core in a sanitary material such as a disposable diaper is associated with such a problem that the water absorbing resin swells when absorbing water and turns into a soft gel state, and causes a gel blocking phenomenon in which any more fluids (urine or blood) cannot be absorbed into the water absorbent core, especially when human's body weight is bearing on the sanitary material such as a disposable diaper, that is, especially under a load. This would lead to a decrease in absorbing amount or leakage of the fluid.

Under this circumstance, the liquid permeability of the water absorbing resin has been spotlighted in recent years, and there have been many reports on sanitary materials such as disposable diapers including the water absorbing resin having higher liquid permeability (See Patent Literatures 1 to 3).

Further, in the water absorbing resin, in order to both suppress the gel blocking and realize a sufficient absorption amount, it is necessary to obtain a water absorbing resin that is excellent in a balance between an absorption capacity represented by a centrifugal retention capacity (CRC), for example, and liquid permeability represented by a saline flow conductivity (SFC), for example. However, they have such a relationship that an increase in one results in a decrease in the other. This makes it difficult to improve the relationship (balance) between them to a successful level. As means for attaining such an object, the following techniques have been known, for example.

Patent Literature 4 discloses a water absorbing resin that has been processed with a tri- or more-valent cation.

Patent Literature 5 discloses a technique with which an electrostatic or stereoscopic spacer is used with a water absorbing resin.

Patent Literature 6 discloses a particulate water absorbing agent containing: water absorbing resin particles produced by (i) cross-linking a monomer containing acrylic acid and/or salt thereof, and (ii) further cross-linking a surface of each of particles thus obtained, which particles have been pulverized into irregular shapes; and an agent for enhancing liquid permeability. An object of Patent Literature 6 is to provide a water absorbing agent having properties of both capillary suction pressure and liquid permeability.

Meanwhile, other than Patent Literature 4 through 6 whose object is to improve the balance between the absorption capacity and the liquid permeability, there has been proposed to mix various additives for the purpose of an improvement in various properties of a water absorbing resin.

For example, Patent Literature 7 discloses a method of producing a water absorbing agent, including the steps of: processing surface of water absorbing resin particles with a cross-linking agent, the water absorbing resin particles having a carboxyl group and the cross-linking agent having two or more functional groups that can form a covalent bond by reacting with the carboxyl group, so as to crosslink a part of the carboxyl group; and then mixing the particles with a cationic polymer compound having a weight-average molecular weight of 2000 or more, which cationic polymer compound can form an ion bond by reacting with the carboxyl group. Thereby, Patent Literature 7 easily obtains a water absorbing agent that hardly moves or is omitted in complex with a cellulose fiber, which water absorbing agent has such a feature so as to be expected to have a synergetic effect in absorption performance.

Further, Patent Literature 8 discloses a water absorbing agent composition containing water-insoluble inorganic powder fine particles and/or a polyamine compound having a weight-average molecular weight of 5000 or more, wherein: under a load of 20 $g/cm^2$ (1.96 kPa), 0.9 weight % sodium chloride solution has a diffusing absorption capacity of 25 g/g or more after a lapse of 60 minutes from the beginning of absorption.

Furthermore, Patent Literature 9 discloses a water absorbing agent composition containing: water absorbing resin particles having at least an anionic dissociable group; and water-swelling resin particles having a cationic group. Thereby, Patent Literature 9 provides a water absorbing agent composition that is more excellent in an absorption speed, a permeability rate of a gel layer, a permeability rate of a gel layer under pressure, and an absorption capacity against pressure respectively, than each of the two kinds of the resin particles solely used.

Patent Literature 10 discloses water absorbing resin particles, wherein: at least a part of a surface of the water absorbing resin particles is coated with a coating film that is made from an adduct of a polyvalent amine compound and a compound having an olefinic double bond. Thereby, Patent Literature 10 provides: a water absorbing agent that is advantageous in an absorption capacity under pressure or no pressure, provides high safety for a human skin and the like, and is suitable for use in a sanitary material; and a method of producing the water absorbing agent.

Further, Patent Literature 11 discloses a mixture of water absorbing resin particles and a cationic polymer compound in which a specific region is crosslinked. Thereby, Patent Literature 11 realizes that, even long after a swelling, it is possible to (i) keep a state where gels clump together and retain a shape, and (ii) have high liquid permeability and a high absorption capacity against pressure.

Patent Literature 12 discloses a water absorbing agent made from a nitrogen-containing polymer having a nitrogen atom that can realize a protonation of 5 to 17 mole/kg against a total mass of particles of a water absorbing agent polymer, and the nitrogen-containing polymer. Thereby, Patent Literature 12 provides a water absorbing agent having: an improved property of high absorption performance; improved liquid permeability; and high water resistance.

Patent Literature 13 discloses a water absorbing resin produced by compounding an acid crosslinked polymer and a basic crosslinked polymer. In Patent Literature 13, a crosslinked polyethylenimine, and a crosslinked polyallylamine are employed as the basic crosslinked polymer.

Meanwhile, there have been many reported water absorbing agents that are crosslinked or coated with polyamine, as shown in Patent Literatures 14 through 31. Among those, there has been reported a water absorbing agent, in which a condensate of (i) one of amines and ammonia and (ii) epihalohydrin is used as a cross-linking agent (Patent Literatures 30 and 31). Patent Literature 30 discloses a method for modifying a resin with high water absorbability. In this method, a water-insoluble resin with high water absorbability having a —COOM group is crosslinked with a reactant of (i) the epihalohydrin and (ii) one of the ammonia and the amines, in order to increase the absorption capacity under pressure, without reductions in the gel strength and absorption capacity without pressure.

Further, Patent Literature 31 discloses that in producing the resin with high water absorbability by polymerizing a polymerizable monomer having a partly-neutralized carboxyl group, if the reactant of (i) the epihalohydrin and (ii) one of the ammonium and the amines is added as the cross-linking agent, a polymerization reaction proceeds smoothly and thereby the crosslinking can be evenly preformed.

Furthermore, Patent Literatures 5, 11, 12, and 25 disclose a method for producing the water absorbing agent, in which the water absorbing resin and the cationic polymer are mixed. A lot of examples of the cationic polymers disclose the condensate of the amines and the epihalohydrin.

The absorption capacity and the liquid permeability generally conflict, and improvement in the liquid permeability has been generally associated with decrease in the absorption capacity. Further, the techniques disclosed in Patent Literatures 4 through 6 are techniques for accomplishing an improvement in relationship between the absorption capacity and the liquid permeability (for realizing a water absorbing resin having higher liquid permeability compared to that having the same absorption capacity) by adding an additive having an effect of increasing the liquid permeability, such additive as polyvalent metal salt (metal cation), inorganic particles, or a polycation, to a water absorbing resin. However, the relationship (balance/improvement in liquid permeability) has still not reached a sufficient level, and much improvement has been demanded. Furthermore, the techniques disclosed in Patent Literatures 7 through 31 have not taken the relationship (balance/improvement in liquid permeability) between the absorption capacity and the liquid permeability to the sufficient level.

Specifically, it has been demanded for the water absorbing agent to have both a high centrifugal retention capacity (CRC) and a high saline flow conductivity (SFC) when the water absorbing agent is actually used. However, the conventional techniques have not successfully satisfied these properties.

CITATION LIST

Patent Literature 1
Pamphlet of International Publication WO95/26209
Patent Literature 2
Specification of European Patent No. 0951913
Patent Literature 3
Specification of European Patent No. 0640330
Patent Literature 4
Pamphlet of International Publication WO2001/74913
Patent Literature 5
Specification of US Patent Application Publication No. 2002/0128618
Patent Literature 6
Pamphlet of International Publication WO2004/069915
Patent Literature 7
Specification of European Patent No. 0493011
Patent Literature 8
Specification of U.S. Pat. No. 5,797,893
Patent Literature 9
Japanese Patent Application Publication, Tokukai, No. 2000-95955
Patent Literature 10
Japanese Patent Application Publication, Tokukai, No. 2002-212301
Patent Literature 11
Specification of European Patent No. 1364992
Patent Literature 12
Specification of US Patent Application Publication No. 2005/0245684
Patent Literature 13
Pamphlet of International Publication WO99/34841
Patent Literature 14
Japanese Patent Application Publication, Tokukai, No. 2008-536987
Patent Literature 15
Japanese Patent Application Publication, Tokukai, No. 2008-536988
Patent Literature 16
Pamphlet of International Publication WO2008/025652
Patent Literature 17
Pamphlet of International Publication WO2008/025655
Patent Literature 18
Pamphlet of International Publication WO2008/025656
Patent Literature 19
Pamphlet of International Publication WO2006/082188
Patent Literature 20
Pamphlet of International Publication WO2006/082189

Patent Literature 21
Pamphlet of International Publication WO2006/082197
Patent Literature 22
Japanese Translation of PCT International Publication, Tokuhyo, No. 2005-537131
Patent Literature 23
Japanese Translation of PCT International Publication, Tokuhyo, No. 2005-536292
Patent Literature 24
Pamphlet of International Publication WO03/043670
Patent Literature 25
Japanese Patent Application Publication, Tokukai, No. 2003-062460
Patent Literature 26
Japanese Translation of PCT International Publication, Tokuhyo, No. 2000-95955
Patent Literature 27
Japanese Translation of PCT International Publication, Tokuhyohei, No. 09-509591
Patent Literature 28
Specification of U.S. Pat. No. 5,382,610
Patent Literature 29
Japanese Patent Application Publication, Tokukaihei, No. 06-287220
Patent Literature 30
Japanese Patent Application Publication, Tokukaihei, No. 02-248404
Patent Literature 31
Japanese Patent Application Publication, Tokukaihei, No. 04-272910

SUMMARY OF INVENTION

In order to attain the above objects, the inventors of the present invention have diligently worked, and found that a water absorbing agent, which contains a water absorbing resin and a certain polymer, has a more improved centrifugal retention capacity (CRC) and a more improved saline flow conductivity (SFC) compared to those obtained through the conventional techniques. As a result, the inventors of the present invention have accomplished the present invention.

In other words, the water absorbing agent of the present invention attains the object of the present application with the following configurations.

[1] A water absorbing agent containing (i) a water absorbing resin (A) and (ii) a polymer (B) being a polyamine polymer having a hydroxyl group on a main chain.

[2] The water absorbing agent, wherein the polymer (B) is obtainable by reacting an amine (b2) and an epihalohydrin (b3), which are monomers and essential components.

[3] The water absorbing agent, wherein the polymer (B) is obtainable by reacting an ammonia (b1), an/the amine (b2), and an/the epihalohydrin (b3), which are monomers and essential components. That is, the water absorbing agent containing (i) the water absorbing resin (A) and (ii) the polymer (B) being obtainable by reacting the ammonia (b1), the amine (b2), and the epihalohydrin (b3), which are monomers and essential components.

[4] A method for producing a water absorbing agent, the method comprising mixing (i) a water absorbing resin (A) and (ii) a polymer (B) being a polyamine polymer having a hydroxyl group on a main chain.

[5] The method described above, wherein the polymer (B) is a polymer being obtainable by reacting an amine (b2) and an epihalohydrin (b3), which are monomers and essential components.

[6] The method described above, wherein the polymer (B) is a polymer being obtainable by reacting an ammonia (b1), an/the amine (b2), and an/the epihalohydrin (b3), which are monomers and essential components. That is, the method for producing a water absorbing agent, the method comprising mixing (i) the water absorbing resin (A) and (ii) the polymer (B) being obtainable by reacting the ammonia (b1), the amine (b2), and the epihalohydrin (b3), which are monomers and essential components.

The water absorbing agent according to the present invention includes the above configurations, and therefore can provide (i) a water absorbing agent that is excellent in a balance between the centrifugal retention capacity (CRC) and the saline flow conductivity (SFC), and in absorption speed, and (ii) a method for producing the water absorbing agent.

Further, since the water absorbing agent according to the present invention is excellent in the balance between the centrifugal retention capacity (CRC) that represents an absorption capacity (absorbing amount) and the saline flow conductivity (SFC) that represents liquid permeability, when the water absorbing agent is used as a water absorbing agent in a sanitary material such a disposable diaper (water absorbent core), which is functionalized and made thinner, it is possible to obtain a sanitary material having excellent fluid absorbing speed. In addition, the water absorbing agent according to the present invention provides high safety, and therefore is suitable also in terms of safety for use in the sanitary material such as the disposable diaper that contacts a human skin.

In addition, the water absorbing agent according to the present invention is preferable also in terms of handlability, because the water absorbing agent according to the present invention has an adequate degree of stickiness, which is lower than that of the conventional water absorbing agents containing polyamine (e.g., polyethyleneimine) and a water absorbing resin.

For a fuller understanding of the nature and advantages of the invention, reference should be made to the ensuing detailed description taken in conjunction with the accompanying drawings.

EXPLANATION OF REFERENTIAL NUMERALS

Figure 1:
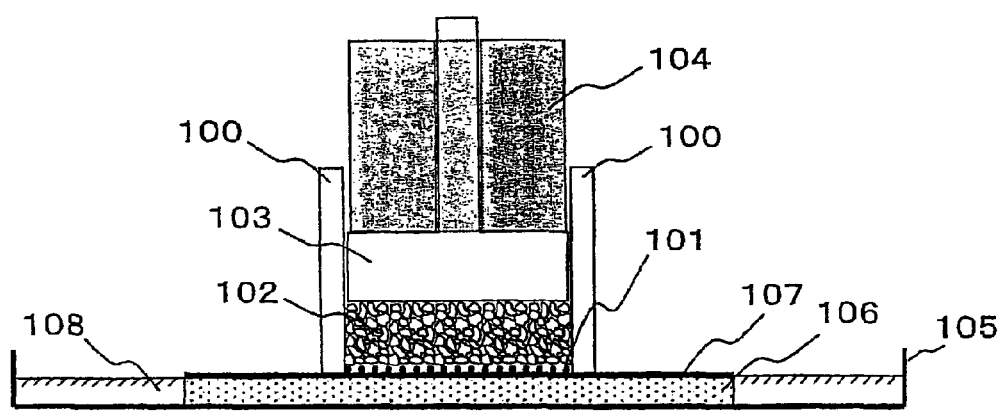
FIG. 1 is a cross sectional view illustrating a measuring apparatus for measuring AAP.

31: Tank
32: Glass tube
33: 0.69 wt % saline
34: L-shaped Tube with cock
35: Cock
40: Vessel
41: Cell
42: Stainless metal net
43: Stainless metal net
44: Swelling gel
45: Glass filter
46: Piston
47: Hole of piston
48: Collecting vessel
49: Pan scales
100: Plastic supporting cylinder
101: Stainless metal net (400 mesh)

102: Swelling gel
103: Piston
104: Load (weight)
105: Petri dish
106: Glass filter
107: Filter paper
108: 0.9 wt % saline

DESCRIPTION OF EMBODIMENTS

The following description explains the present embodiment. However, the scope of the present invention is not limited to this description, but rather may be applied in many variations within the spirit of the present invention. In the present invention, "weight" and "mass", and "weight %" and "mass %" are regarded having the same meaning; the expression used in the description is unified as "mass" and "mass %". Further, in this description, numerical ranges such as "A to B" mean "not less than A but not more than B".

The following are definitions of abbreviations used in this description. In the present specification, a CRC (Centrifuge Retention Capacity) is a centrifuge retention capacity, and is a value obtained by a measuring method as explained in Examples later described. An SFC (Saline Flow Conductivity) is a conductivity of a saline flow, and is a value obtained by a measuring method as explained in Examples later described. An AAP (Absorbency against Pressure) is absorbency under a pressure of 4.83 kPa, and is a value obtained by a measuring method as explained in Examples later described. An FSR (Free Swell Rate) is one of the indices that represent an absorption speed, and is a value obtained by a measuring method as explained in Examples later described. D50 (Distribution) is a mass median particle size, and is a value obtained by a measuring method explained in Examples later described. A $\sigma\zeta$ is a logarithmic standard deviation of a particle size distribution, and is a value obtained by a measuring method explained in Examples later described. An FHA (Fixed Height Absorption) is a fixed height absorption, and is a value obtained by a measuring method explained in Examples later described. Moreover, in the present specification, saline denotes sodium chloride aqueous solution.

The water absorbing agent according to the present invention is an absorbing solidification agent for absorbing and solidifying an aqueous liquid, which absorbing solidification agent includes (i) a water absorbing resin (A) and (ii) a polymer (B) being a polyamine polymer having a hydroxyl group on a main chain.

The water absorbing agent according to the present invention encompasses an absorbing solidification agent of an aqueous liquid, which absorbing solidification agent includes a water absorbing resin (A) and further includes a polymer (B) being obtainable by reacting an amine (b2) and an epihalohydrin (b3), which are monomers and essential components.

Further, the water absorbing agent according to the present invention may be an absorbing solidification agent of an aqueous liquid, which absorbing solidification agent includes a water absorbing resin (A) and further includes a polymer (B) being obtainable by reacting an ammonia (b1), an/the amine (b2), and an/the epihalohydrin (b3), which are monomers and essential components.

The water absorbing agent according to the present invention may be selected from those including a water absorbing resin (A) as a main component, and further including the polymer (B). Here, the "main component" indicates that an amount of the water absorbing resin contained in the water absorbing agent is at least 50 mass %, but not more than 99.999 mass %, with respect to a whole amount of the water absorbing agent. The amount of the water absorbing resin contained in the water absorbing agent with respect to a whole amount of the water absorbing agent is more preferably in a range of not less than 60 mass % but not more than 99.999 mass %, further preferably in a range of not less than 80 mass % but not more than 99.999 mass %, further preferably in a range of not less than 90 mass % but not more than 99.999 mass %, particularly preferably in a range of not less than 95 mass % but not more than 99.999 mass %, and most preferably in a range of not less than 98 mass % but not more than 99.999 mass %.

Similarly, the amount of the polymer (B) contained in the water absorbing agent with respect to a whole amount of the water absorbing agent is preferably in a range of not less than 0.001 mass % but not more than 10 mass %, and more preferably in a range of not less than 0.01 mass % but not more than 5 mass %. Further, the amount of the polymer (B) contained in the water absorbing agent is preferably 0.001 to 10 parts by mass, and more preferably not less than 0.01 parts by mass but not more than 5 parts by mass, with respect to 100 parts by mass of the water absorbing resin (A).

It is preferable that the amount of the polymer (B) contained in the water absorbing agent with respect to the whole amount of the water absorbing agent be not less than 0.001 mass %, because with this amount, it is possible to obtain a water absorbing agent that is excellent in a balance between the centrifugal retention capacity (CRC) and the saline flow conductivity (SFC), and in an absorption speed. It is also preferable that the amount of the polymer (B) contained in the water absorbing agent with respect to the whole amount of the water absorbing agent be not more than 10 mass %, because with this amount, it is possible to keep high values of CRC. Further, it is also preferable that the amount of the polymer (B) with respect to 100 parts by mass of the water absorbing resin (A) be not less than 0.001 parts by mass, because with this amount, it is possible to obtain a water absorbing agent that is excellent in the balance between the centrifugal retention capacity (CRC) and the saline flow conductivity (SFC), and in the absorption speed. Furthermore, it is also preferable that the amount of the polymer (B) with respect to 100 parts by mass of the water absorbing resin (A) be not more than 10 parts by mass, because with this amount, it is possible to keep high values of CRC.

In addition to the water absorbing resin (A) and the polymer (B), the water absorbing agent according to the present invention generally contains water, and further contains other additives if necessary.

The aqueous liquid is not limited to water, and is not limited to a particular kind as long as the aqueous liquid contains water. The aqueous liquid may be urine, blood, excrement, waste fluid, moisture and vapor, ice, a mixture of water and an organic solvent and/or an inorganic solvent, rainwater, ground water, and the like. However, urine, particularly urine of human beings is more preferred as the aqueous liquid.

The following description sequentially explains (1) water absorbing resin (A) contained in water absorbing agent of the present invention, (2) polymer (B), (3) other additives, (4) water absorbing agent, (5) method for producing a water absorbing agent, and (6) water absorbent core.

(1) Water Absorbing Resin (A) Contained in Water Absorbing Agent of Present Invention Water absorbing resin to be used in the water absorbing agent according to the present invention is a water-insoluble water-swelling hydrogel-forming polymer (hereinafter the water absorbing resin may be referred to as water-insoluble water-swelling hydrogel-forming polymer in the present specification), which is obtainable by polymerizing a water-soluble unsaturated monomer.

Specific examples of the water-insoluble water-swelling hydrogel-forming polymer encompass: a partially neutralized, cross-linked polyacrylic acid polymer (e.g., U.S. Pat. Nos. 4,625,001, 4,654,039, 5,250,640, and 5,275,773, and European patent No. 456136), a cross-linked and partially neutralized starch-acrylic acid-grafted polymer (U.S. Pat. No. 4,076,663), an isobutylene-maleic acid copolymer (U.S. Pat. No. 4,389,513), a saponified vinyl acetate-acrylic acid copolymer (U.S. Pat. No. 4,124,748), a hydrolysate of acrylamide (co)polymer (U.S. Pat. No. 3,959,569), and a hydrolysate of acrylonitrile polymer (U.S. Pat. No. 3,935,099).

The water absorbing resin contained in the water absorbing agent of the present invention is more preferably a particle of water absorbing resin made of a polyacrylic acid (salt) cross-linked polymer obtained by polymerizing a monomer containing acrylic acid and/or a salt thereof, as the water-soluble unsaturated monomer. The polyacrylic acid (salt) cross-linked polymer denotes a cross-linked polymer obtained by polymerizing a monomer containing at least 50 mol %, preferably not less than 70 mol %, more preferably not less than 90 mol % of acrylic acid and/or the salt thereof.

Moreover, preferably at least 50 mol % but not more than 90 mol %, more preferably not less than 60 mol % but not more than 80 mol % of an acid group of the polyacrylic acid (salt) cross-linked polymer is neutralized. Examples of the polyacrylic acid salt encompass: alkaline metal salts of such as sodium, potassium, and lithium; ammonium salt; and amine salt. Among these, it is preferable for the polyacrylic acid salt to be sodium salt. Neutralization in order to form the salt may be carried out in a monomer state prior to the polymerization, or may be carried out during the polymerization or after the polymerization in a polymer state. Alternatively, the neutralization may be carried out in both states.

The polyacrylic acid (salt) cross-linking polymer that is preferably used as the water absorbing resin used in the water absorbing agent according to the present invention may be one which another monomer is copolymerized with the monomer used as the main component (acrylic acid and/or the salt thereof) if necessary.

Examples of the another monomer encompass monomers disclosed in WO2007/116777 A1. Specifically, examples of the another monomer encompass: anionic unsaturated monomers and salts thereof; nonionic unsaturated monomers containing a hydrophilic group; and cationic unsaturated monomers. A using amount of the other monomer is preferably in a range of 0 mol % or more but not more than 30 mol % with respect to a whole monomer amount, and is more preferably is in a range of 0 mol % or more but not more than 10 mol %.

It is preferable for the water absorbing resin that is used in the present invention to be a cross-linked polymer having an internal cross-linked structure. The following methods are examples of a method as to introduce the internal cross-linked structure to the water absorbing resin: a method introducing the internal cross-linked structure by self-cross-linking without use of a cross-linking agent; a method introducing the internal cross-linked structure by copolymerizing or reacting an internal cross-linking agent having at least two polymerizable unsaturated groups and/or at least two reactive groups in one molecule; and the like. Among these methods, it is preferable to use the method introducing the internal cross-linked structure by copolymerizing or reacting the internal cross-linking agent.

Specific examples of the internal cross-linking agent encompass: N,N'-methylene bis(meth)acrylamide, (poly) ethylene glycol di(meth)acrylate, (poly)propylene glycol di(meth)acrylate, 3-methyl-1,3-butanediol di(meth)acrylate; other internal cross-linking agents disclosed in WO2007/116777 A1; polyhydric alcohols such as ethylene glycol, polyethylene glycol, 1,4-butanediol, propylene glycol, and pentaerythritol; ethylenediamine, polyethyleneimine, and glycidyl(meth)acrylate.

These internal cross-linking agents may be used solely or two or more kinds thereof may be used in combination. In particular, it is preferable to essentially use, as the internal cross-linking agent, a compound having at least two polymerizable unsaturated groups, in view of water absorbing characteristics of the water absorbing resin particles thus obtained.

A using amount of the internal cross-linking agent is preferably in a range of not less than 0.005 mol % but not more than 3 mol % with respect to the whole monomer amount, and is further preferably in a range of not less than 0.01 mol % but not more than 2 mol %, and is most preferred in a range of not less than 0.05 mol % but not more than 0.2 mol %.

In polymerization, a hydrophilic polymer or chain transfer agent may be added. Examples of the hydrophilic polymer encompass: hydrophilic polymers such as starch-cellulose, a derivative of starch-cellulose, polyvinyl alcohol, polyacrylic acid and/or a salt thereof, and a cross-linked polymer of polyacrylic acid and/or a salt thereof. Examples of the chain transfer agent encompass hypophosphorous acid and/or a salt thereof.

In polymerizing a monomer whose main component is the acrylic acid and/or the salt thereof, for example, bulk polymerization, reversed phase suspension polymerization, or precipitation polymerization may be carried out. However, from views of properties of the resultant water absorbing resin and ease in controlling the polymerization, it is more preferable to carry out the reversed phase suspension polymerization or aqueous solution polymerization in which the monomer is used in the form of an aqueous solution. Such polymerization method is described, for example, in U.S. Pat. Nos. 4,625,001, 4,769,427, 4,873,299, 4,093,776, 4,367,323, 4,446,261, 4,683,274, 4,690,996, 4,721,647, 4,738,867, and 4,748,076, and in U.S. patent application publication No. 2002/40095.

In polymerizing the monomer, for example, radical polymerization initiators such as potassium persulfate, ammonium persulfate, sodium persulfate, t-butyl hydroperoxide, hydrogen peroxide, and 2,2-azobis(2-amidinopropane)dihydrochloride; and a polymerization initiator sensitive to a radiation ray, electron beam, and ultraviolet ray may be used. Further, the polymerization reaction may be carried out by: exposing a reaction system to an active energy ray such as the radiation, electron beam, and ultraviolet ray; using a combination of the active energy ray and the polymerization initiator sensitive to the radiation ray, electron beam, and ultraviolet ray; or using a combination of the active energy ray and the radical polymerization initiator. In a case where the radical polymerization initiator is used, a reductant agent such as sodium sulfite, sodium hydrogensulfite, ferrous sulfate, and L-ascorbic acid may be used together with the radical polymerization initiator, so as to carry out a redox polymerization. Further, a using amount of the polymerization initiator is preferably in a range of not less than 0.001 mol % but not more than 2 mol % with respect to the whole monomer amount, and is more preferably in a range of not less than 0.01 mol % but not more than 0.5 mol %.

Further, the water absorbing resin to be used in the present invention may contain a chelate agent. A step at which the chelate agent is mixed is not particularly limited, but the chelate agent is preferably mixed with the monomer or mixed in the monomer solution. Examples of the chelate agent encompass a polymeric chelate agent or non-polymeric chelate agent of various kinds. The chelate agent is preferably a non-polymeric chelate agent containing an acid group (its molecular weight is preferably 100 to 1000, and particularly preferably 100 to 500), and more preferably a non-polymeric chelate agent containing a phosphoric acid or a non-polymeric chelate agent containing a carboxylic acid group. Among those, a non-polymeric chelate agent containing 2 to 10 acid groups, further preferably 2 to 6 acid groups is preferable for use, while a chelate agent containing nitrogen therein (preferably aminocarboxylic acid (or salt thereof)) is also preferable. Further, the chelate agent is preferably soluble in water.

Examples of the chelate agent encompass: chelate agents disclosed in U.S. Pat. No. 6,599,989 and WO2008/090961 A1. Among those, more preferred is an organic phosphorus compound disclosed in WO2008/090961 A1.

A using amount of the chelate agent with respect to 100 parts by mass of the water absorbing resin is preferably not less than 0.001 parts by mass, more preferably not less than 0.01 parts by mass, and further preferably not less than 0.05 parts by mass, but preferably not more than 1 parts by mass, more preferably not more than 0.5 parts by mass, further preferably not more than 0.2 parts by mass, and particularly preferably not more than 0.1 parts by mass.

The water absorbing resin thus obtained by the polymerization is preferably in a particle shape, and generally in an irregularly-crushed shape, a sphere shape, a fiber shape, a bar shape, a substantially sphere shape, a flat shape, or the like. However, it is more preferable for the shape of the water absorbing resin to be the irregularly-crushed shape.

In a case where the cross-linked polymer is obtained by the aqueous polymerization and is of a gel form, in other words, the cross-linked polymer is a hydrous gel cross-linked polymer (hereinafter may be referred to as hydrous gel), the hydrous gel cross-linked polymer is preferably dried, and is crushed before and/or after drying so as to obtain the water absorbing resin particles. In the present invention, drying denotes an operation to increase solid content. Usually, the solid content is to increase as compared to that of which is not dried, however is more preferably increased so that the solid content increases to at least 90 mass %, having an upper limit of approximately 99 mass %. The drying may be carried out concurrently with the polymerization, or both the drying during the polymerization and the drying after the polymerization may be carried out. However, it is preferable to provide a drying step after the polymerization, for drying the hydrous gel cross-linked polymer by use of a drying device. In the present invention, it is preferable for the water absorbing resin which has been dried to have the solid content of at least 90 mass %, and further preferably not less than 95 mass %. Low solid content not only worsens fluidity of the water absorbing resin, which causes difficulty in production, but also makes it difficult to crush the water absorbing resin. This may lead to a condition where the particle size cannot be controlled into a specific particle size distribution. Note that the solid content of the water absorbing resin is indicative of a value to be measured by a measuring method later described.

In the present invention, the drying is carried out in a temperature range of 100° C. to 250° C., for at least 50% of a time taken for the drying step, and preferably during the whole drying step. A drying temperature of 100° C. or higher will not cause undried products, so that the water absorbing resin can be well pulverized. As a result, it is possible to easily control the particle size distribution. A drying temperature of 250° C. or lower does not damage the water absorbing resin, so that a water-soluble content is not increased. As a result, it is possible to improve physical properties. Drying temperature is defined by a heat carrier, however if it is not possible to define the drying temperature by the heat carrier, for example in a case of a microwave, the drying temperature is defined by material temperature. A drying method is not particularly limited as long as the drying temperature is in the above range, and methods such as hot air drying, no-wind drying, vacuum drying, infrared ray drying, or microwave drying are suitably used. In particular, it is preferable to use the hot air drying method. Wind speed (speed of a wind blowing straight through flatly-spread objects that are to be dried) in a case where the hot air drying is used is preferably in a range of 0.01 m/sec to 10 m/sec, and more preferably in a range of 0.1 m/sec to 5 m/sec.

The drying temperature is preferably in a range of 130° C. to 220° C., and is further preferably in a range of 150° C. to 200° C. The drying may be carried out at a fixed temperature or at varying temperatures. However, it is preferable that the temperature be maintained within the above ranges substantially throughout the drying step.

A drying time differs depending on a surface area; moisture content of the polymer; and a type of drying machine, and is appropriately selected so that the polymer attains a target moisture content. The drying time is usually in a range of 10 to 120 minutes, more preferably in a range of 20 to 90 minutes, and further preferably in a range of 30 to 60 minutes. A drying time of 10 minutes or longer makes it possible to obtain a sufficiently-dried water absorbing resin having an excellent handlability. A drying time of 120 minutes or shorter does not damage the water absorbing resin, so that the water-soluble content does not increase. As a result, it is possible to attain an effect of improving the physical properties.

The water absorbing resin thus obtained is pulverized by a pulverizer. Pulverizing may be carried out at any timing, before the drying, during the drying, or after the drying, however it is more preferably carried out after the drying. The pulverizer is not particularly limited, and a roller-type pulverizer (e.g. roller mill), a hammer type pulverizer (e.g. hammer mill), an impact mill, a cutter mill, a turbo grinder, a ball mill, a flash mill or the like is used for example. In particular, it is preferable to use the roller mill in order to control the particle size distribution. It is more preferable to pulverize the water absorbing resin for at least two times consecutively in order to control the particle size distribution, and is further preferable to pulverize the water absorbing resin for at least three times consecutively. In the case the water absorbing resin is pulverized for at least two times, the pulverizer thus used may be same or different to each other. It is possible to use different types of pulverizer in combination.

In order to control the water absorbing resin particles thus pulverized in a specific particle size distribution, particles that are larger than a specific particle size may be removed by classifying the water absorbing resin particles by use of a sieve having a specific opening size. Further, the removed particles may be again pulverized so as to be controlled in the specific particle size range. A classifying machine that is used for classifying the water absorbing resin particles by use of the sieve is not particularly limited. For example, a vibrating sieve (i.e., an unbalanced weight-driven method, a resonant method, a vibrating motor method, an electromagnetic method, and a circular vibration method), in-plane motion sieve (i.e., a horizontal motion method, a horizontal circle-linear motion method, and a three-dimensional circular motion method), a movable net sieve, a compulsory stirring sieve, a net plane vibration sieve, a wind force sieve, a sonic sieve, and the like are used. Among these methods, the vibrating sieve or the in-plane motion sieve is more preferably used. The opening size of the sieve is preferably in a range of 1000 μm to 100 μm. It is more preferable to use a plurality of (preferably 2 to 7) sieves having the opening size within the range, so as to attain the target particle size distribution.

In order to control the water absorbing resin particles thus classified as the above into a further specific particle size distribution, the water absorbing resin particles may be further classified, so as to remove a part or all of the particles that are smaller than the specific particle size. A classifying machine to be used in such step is not particularly limited, however the aforementioned machines are preferably used, and other machines such as a pulverizing type classification device (e.g., centrifugal force type, inertial force type) may also be used. In the present step, a part or all of the particles having a particle size of less than 200 μm, more preferably less than 150 μm, and most preferably less than 106 μm, is to be removed.

As described above, the water absorbing resin to be used in the present invention is a water-swelling cross-linked polymer, which internally includes a cross-linked structure (inside a particle of the water-swelling cross-linked polymer). The water absorbing resin (particle) is preferably further surface cross-linked, so that a crosslink density on the surface and/or shallow surface is higher than that inside the water absorbing resin (particle). Note that the surface and/or the shallow surface generally denote an area whose distance from a surface layer of the water absorbing resin is not more than several tens of μm, and/or an area whose distance from the surface layer of the water absorbing resin is not more than one-tenth the thickness of the water absorbing resin. However, the depth is determined depending on a purpose, as needed.

The water absorbing resin may be: (1) surface cross-linked with a surface cross-linking agent, which is an organic surface cross-linking agent other than the polymer (B) and/or a water-soluble inorganic surface cross-linking agent, (2) cross-linked and polymerized on the surface with a cross-linking monomer (e.g., U.S. Pat. No. 7,201,941), or (3) surface cross-linked with a radical that is generated from persulfate or the like (e.g., U.S. Pat. No. 4,783,510). Further, a cross-linking reaction is preferably promoted by heat or radiation ray (preferably ultraviolet ray, e.g., European patent No. 1824910). The water absorbing resin contained in the water absorbing agent makes it possible to dramatically improve a liquid permeability of the water absorbing agent, when the water absorbing resin is surface cross-linked on the surface and/or shallow surface. The liquid permeability can be further improved when the polymer (B) and the surface cross-linking are used in combination.

In the present invention, the polymer (B) is mixed to the water absorbing resin (A). In the case where the water absorbing resin is surface cross-linked in the present invention, an order of mixing the polymer (B) and surface cross-linking of the water absorbing resin is not particularly limited, and any one of which may be performed in first and both of which may be performed concurrently. The steps of mixing the polymer (B) and surface cross-linking of the water absorbing resin can be performed either concurrently or separately, but more preferably, the water absorbing resin is surface cross-linked with a surface cross-linking agent other than the polymer (B) (that is, in the absence of the polymer (B)), and thereafter, the polymer (B) is mixed to thus surface cross-linked water absorbing resin.

The method of the surface cross-linking of the water absorbing resin with use of the surface cross-linking agent is described as follows, as a preferable method of cross-linking. The surface cross-linking of the water absorbing resin by use of the surface cross-linking agent may be carried out at any stage of production; however, in the case where the water absorbing resin is in a particle shape, it is preferably carried out after the water absorbing resin particles are controlled to a specific particle size distribution.

An example of the surface cross-linking agent encompasses a surface cross-linking agent which contains at least two functional groups that can react with a functional group contained in the water absorbing resin, for example a carboxyl group. Such surface cross-linking agent may be organic or inorganic, however in particular, a water-soluble organic surface cross-linking agent is suitably used.

Examples of the surface cross-linking agent encompass a variety of organic or inorganic surface cross-linking agents. Preferably used as the surface cross-linking agent in terms of properties of the resultant water absorbing resin and handlabilities are those that can react with a carboxyl group. Examples of such surface cross-linking agents encompass: polyhydric alcohols; epoxy compound; polyamine compound; haloepoxy compound; oxazoline compound; mono-, di-, and poly-oxazolidinone compounds; polyvalent metal salt; and alkylene carbonate compound. More specifically, examples of such cross-linking agents encompass compounds disclosed in U.S. Pat. No. 6,228,930, U.S. Pat. No. 6,071,976, and U.S. Pat. No. 6,254,990.

Examples of the surface cross-linking agent are polyhydric alcohols such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerol, 2-butene-1,4-diol, 1,3-butanediol, 1,4-butanediol, 1,5-pentanediol, 1,6-hexanediol, 1,2-cyclohexandimethanol, 1,2-cyclohexanol, trimethylolpropane, diethanolamine, triethanolamine, polyoxypropylene, oxyethyleneoxypropylene block copolymer, pentaerythritol, and sorbitol; polyamine compounds and inorganic or organic salts thereof (for example, azetidinium salt and the like); polyisocyanate compounds such as 2,4-tolylene diisocyanate and hexamethylene diisocyanate; polyoxazoline compounds such as 1,2-ethylene bisoxazoline; compounds having urea structure such as urea, thiourea, imidazolidinone, guanidine, and dicyandiamide; oxazolidinone compounds such as N-acyl-2-oxazolidinone and 2-oxazolidinone; alkylene carbonate compounds such as 1,3-dioxolane-2-one, 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, and 1,3-dioxopane-2-one; haloepoxy compounds such as epicholorohydrin, epibromhydrin, and a-methylepichlorohydrin; silane coupling agents such as γ-glycidoxypropyltrimethoxysilane and γ-aminopropyltriethoxysilane; and oxetane compounds.

One kind of the surface cross-linking agent may be used, or two or more types of the surface cross-linking agent may be used in combination. Among those, the oxazolidinone compounds, alkylene carbonate compounds, polyhydric alcohols, and oxetane compounds are preferred, the polyhydric alcohols and oxetane compounds are further preferred for their high safeness, and in particular, the polyhydric alcohols are preferred for their ability to improve hydrophilicity of the surface of the water absorbing resin particles.

A using amount of the surface cross-linking agent is preferably in a range of not less than 0.001 parts by mass but not more than 5 parts by mass, with respect to 100 parts by mass of solid content of the water absorbing resin particles.

Water may be used in mixing the surface cross-linking agent and the water absorbing resin particles. A using amount of the water is preferably in a range of more than 0.5 parts by mass but not more than 10 parts by mass, with respect to 100 parts by mass of the solid content of the water absorbing resin particles, and is more preferably in a range of not less than 1 parts by mass but not more than 5 parts by mass.

When the surface cross-linking agent or an aqueous solution thereof is mixed with the water absorbing resin particles, a hydrophilic organic solvent or a third material may be used as a mixing auxiliary agent. In a case where the hydrophilic organic solvent is used, a hydrophilic solvent described in International Publication No. 2004/069915 may be used for example.

A using amount of the hydrophilic organic solvent, although depending on type, particle size, and moisture content of the water absorbing resin particles, is preferably not more than 10 parts by mass with respect to 100 parts by mass of the solid content of the water absorbing resin particles, and is more preferably in a range of 0 or more parts by mass but not more than 5 parts by mass.

Moreover, inorganic acids, organic acids, polyamino acids and the like described in European Patent No. 0668080 may exist as the third material. These mixing auxiliary agents may work as the surface cross-linking agent, however is preferably one which does not decrease water absorbing ability of the water absorbing resin particles that are obtained after the surface cross-linking. The water absorbing resin particles used in the present invention is preferably cross-linked by (i) mixing the water absorbing resin particles with a surface cross-linking agent, which surface cross-linking agent does not contain a hydrophilic organic solvent having a boiling point of not more than 100° C., and (ii) heating this mixture. If the water absorbing resin particles do not contain the hydrophilic organic solvent having a boiling point of not more than 100° C., it is possible to avoid a condition change of the surface cross-linking agent on the surface of the water absorbing resin particles caused by vaporization of the hydrophilic organic solvent, because the hydrophilic organic solvent hardly evaporates. This is preferable because physical properties such as an SFC are sufficiently attained.

In order to evenly mix the water absorbing resin particles and the surface cross-linking agent, it is preferable to have a water-soluble inorganic salt (more preferably persulfate) coexist with the water absorbing resin particles and the surface cross-linking agent, when the water absorbing resin particles and the surface cross-linking agent are mixed together. Although dependent on the type, particle size and the like of the water absorbing resin particles, a using amount of the water-soluble inorganic salt is preferably in a range of not less than 0.01 parts by mass but not more than 1 parts by mass with respect to 100 parts by mass of the solid content of the water absorbing resin particles, and is more preferably in a range of not less than 0.05 parts by mass but not more than 0.5 parts by mass. Further, the water absorbing resin particles are preferably cross-linked by (i) mixing the water absorbing resin particles with an organic surface cross-linking agent containing a water-soluble inorganic salt, preferably persulfate, in an amount not less than 0.01 mass % but not more than 1.0 mass % with respect to the whole mass of water absorbing resin particles and/or a water-soluble inorganic surface cross-linking agent, and (ii) heating this mixture.

A mixing method for mixing the water absorbing resin and the surface cross-linking agent is not particularly limited. Examples of the methods that are possibly used encompass: a method in which a surface cross-linking agent that is dissolved in water and/or a hydrophilic organic solvent if necessary is mixed with water absorbing resin which is soaked in the hydrophilic organic solvent; and a method in which a surface cross-linking agent that is dissolved in water and/or a hydrophilic organic solvent is sprayed or dropped directly to the water absorbing resin.

After the water absorbing resin and the surface cross-linking agent are mixed, it is preferable to heat the mixture so as to carry out a cross-linking reaction. A heating temperature, although dependent on the surface cross-linking agent which is to be used, is preferably in a range of not less than 40° C. but not more than 250° C., is more preferably in a range of not less than 100° C. but not more than 240° C., and is further preferably not less than 150° C. but not more than 230° C. It is preferable that the heating temperature be 40° C. or higher because such heating temperature sufficiently improves absorbing properties such as the AAP and the SFC. Also, it is preferable that the heating temperature be 250° C. or lower because such heating temperature can avoid deterioration of the water absorbing resin, so that various physical properties can be kept in a good condition. Heating is preferably carried out for not less than 1 minute to not more than 2 hours, and more preferably for not less than 5 minutes to not more than 1 hour.

In the case where the water absorbing resin to be used in the present invention is in a particle shape, the particle preferably has a mass median particle size in a range of not less than 100 μm but not more than 600 μm, more preferably in a range of not less than 200 μm but not more than 500 μm, and is most preferred to be in a range of not less than 300 μm but not more than 400 μm. It is preferable that the mass median particle size of the water absorbing resin particles be in the range of not less than 100 μm but not more than 600 μm, because such water absorbing resin particles are excellent in fluid permeability and fluid diffusibility, and its absorbing speed is not slowed down. Use of such water absorbing resin particles, for example in disposable diapers, is preferable because leaking of fluid or the like will not occur.

The water absorbing resin particles used in the present invention more preferably includes at least 50 mass % of water absorbing resin particles having a size in a range of not less than 175 μm to not more than 710 μm, and still more preferably includes at least 80 mass % of the water absorbing resin particles of that size.

In addition, an amount of particles having a size which can pass through a sieve with openings of 150 μm thus included in the water absorbing resin particles used in the present invention is preferably not more than 5 mass %, more preferably not more than 3 mass %, and further preferably not more than 1 mass %, with respect to the whole mass of the water absorbing resin particles. Use of the water absorbing resin particles including not more than 5 mass % of particles having the size which can pass through the sieve with openings of 150 μm with respect to the whole mass of the water absorbing resin particles for the water absorbing agent, allows suppression of an amount of dust in the water absorbing agent thus obtained. Therefore, it is possible to prevent a safety and sanitation problem caused by dispersion of fine particles contained in the water absorbing resin particles at the time of producing the water absorbing agent. Moreover, it is possible to prevent decrease in physical property of the water absorbing agent thus obtained.

Furthermore, as the water absorbing resin particles, fine water absorbing resin particles having a mass median particle size of not more than 300 μm (hereinafter suitably referred to as "fine powder") that are agglomerated, dried, adjusted in particle size and surface cross-linked may be used. Water absorbing resin particles which are obtained by partially mixing agglomerated products of the fine powder with the water absorbing resin particles i.e., primary particles obtained by pulverization and having an irregularly-pulverized shape may also be used as the water absorbing resin particles. By thus partially mixing the agglomerated product of the fine powder with the water absorbing resin particles, a water absorbing agent having further excellent absorbing properties such as water absorbing speed, and fixed height absorption (FHA) as described in U.S. patent application publication No. 2005/0003191 A1, is obtainable. An amount mixed of the agglomerated product of the fine powder contained in the water absorbing resin particles is preferably at least 5 mass %, more preferably not less than 10 mass %, further preferably not less than 15 mass %, and most preferred to be not less than 20 mass %. An upper limit of the amount is preferably not more than 80 mass %, and more preferably not more than 60 mass %. Note that particle size of the fine powder is indicated by the opening size of the sieve of which is used for classifying the fine powder.

Known techniques for reproducing the fine powder are usable, as a method for producing the agglomerated product of the fine powder. For example, the following methods are usable: a method in which warm water and the fine powder is mixed and dried (U.S. Pat. No. 6,228,930); a method in which the fine powder and a monomer aqueous solution is mixed and polymerized (U.S. Pat. No. 5,264,495); a method in which water is added to the fine powder so as to agglomerate by applying a specific plane pressure (European patent No. 844270); a method in which fine powder is sufficiently swollen so as to form an amorphous gel, then drying and crushing the amorphous gel (U.S. Pat. No. 4,950,692); and a method in which the fine powder and a polymerized gel is mixed (U.S. Pat. No. 5,478,879).

In particular, it is preferable to use the method in which the fine powder is mixed with warm water and is dried, as the production method of the agglomerated fine powder. The water absorbing resin particles agglomerated in this method has a porous structure (a same structure as a porous structure described in Japanese Patent Application Publication, Tokukai, No. 2004-261797), and therefore is preferable. It is preferable for the water absorbing resin particles used in the present invention to include particles having the porous structure by at least 5 mass %, more preferably not less than 10 mass %, further preferably not less than 15 mass %, and particularly preferably not less than 20 mass %. The upper limit of the amount of the particles is preferably not more than 80 mass %, and more preferably not more than 60 mass %. By thus having the water absorbing resin particles contain the agglomerated fine powder having the porous structure, the water absorbing resin particles and a water absorbing agent thus containing the water absorbing resin particles excel in the fixed height absorption (FHA).

A CRC of the water absorbing resin (in a particle shape) (A) to be used in the present invention is preferably not less than 5 (g/g), more preferably not less than 15 (g/g), and further preferably not less than 25 (g/g). An upper limit of the CRC is not particularly limited, however is preferably not more than 70 (g/g), more preferably not more than 50 (g/g), and further preferably not more than 40 (g/g). The water absorbing resin particles having CRC of 5 (g/g) or more are suitable for use in sanitary materials such as disposable diapers, because an absorbing amount is large in the case where the water absorbing resin particles are used in the water absorbing agent. Also, the water absorbing resin particles having CRC of 70 (g/g) or less can provide a water absorbing agent that is excellent in fluid absorbing speed into the water absorbent core, when the water absorbing resin particles are used in the water absorbing agent.

An AAP of the water absorbing resin (in a particle shape) to be used in the present invention is not less than 8 (g/g), preferably not less than 16 (g/g), more preferably not less than 20 (g/g), further preferably not less than 22 (g/g), and most preferably not less than 24 (g/g). An upper limit of the AAP is not particularly limited, however is preferably not more than 30 (g/g). The water absorbing resin particles having AAP of 8 (g/g) or more can provide a water absorbing agent from which an amount of liquid squeezed out (so-called Re-Wet) is little when a pressure is applied to the water absorbent core, in the case where the water absorbing resin particles are used in the water absorbing agent.

The SFC of the water absorbing resin used in the present invention is preferably not less than 10 $(cm^3 \cdot s \cdot 10^{-7} \cdot g^{-1})$, more preferably not less than 30 $(cm^3 \cdot s \cdot 10^{-7} \cdot g^{-1})$, and further preferably not less than 50 $(cm^3 \cdot s \cdot 10^{-7} \cdot g^{-1})$. The water absorbing resin particles having SFC of 10 $(cm^3 \cdot s \cdot 10^{-7} \cdot g^{-1})$ or more improves fluid permeability, and therefore it is possible to obtain a water absorbing agent which is excellent in fluid absorbing speed into the water absorbent core in the case where the water absorbing resin particles are used in the water absorbing agent. An upper limit of the SFC is not particularly limited, however is preferably not more than 3000 $(cm^3 \cdot s \cdot 10^{-7} \cdot g^{-1})$, and is more preferably not more than 2000 $(cm^3 \cdot s \cdot 10^{-7} \cdot g^{-1})$. The water absorbing resin particles having SFC of 3000 $(cm^3 \cdot s \cdot 10^{-7} \cdot g^{-1})$ or less can prevent fluid leakage from the water absorbent core, in the case where the water absorbing resin particles are used in the water absorbing agent.

It is preferable for the water absorbing resin used in the present invention to have water-soluble content of not more than 35 mass %, more preferably not more than 25 mass %, and further preferably not more than 15 mass %. If the water-soluble content is 35 mass % or less, the water absorbing resin particles will have high gel strength, and become excellent in liquid permeability. Moreover, when the water absorbing resin particles are used in the water absorbing agent, it is possible to obtain a water absorbing agent from which an amount of liquid squeezed out (so-called Re-Wet) is little when a pressure is applied to the water absorbent core.

An absorption speed at which the water absorbing resin used in the present invention absorbs fluids can be measured by Vortex water-absorption time, which is one of the indices representing the absorption speed. It is preferable for the water absorbing resin used in the present invention to have Vortex water-absorption time of preferably not more than 380 seconds, more preferably not more than 160 seconds, further preferably not more than 100 seconds, and most preferably not more than 70 seconds. A lower limit of the Vortex water-absorption time is preferably not less than 1 second. It is preferable that the water absorbing resin have the Vortex water-absorption time of not more than 380 seconds, because fluid is sufficiently absorbed and fluid leakage does not occur, for example in the case where the water absorbing agent containing the water absorbing resin according to the present invention is used in the water absorbent core. Note that in the present invention, the Vortex water-absorption time is a value measured by a method as explained in Examples later described. Generally, the lower the value, the more excellent the absorption speed is. The water absorbing resin having a lower value of Vortex water-absorption time will have improved fluid absorbing speed into the water absorbent core.

Further, it is preferable for the water absorbing resin used in the present invention to have FSR (another index of the absorption speed) of not less than 0.05 g/g/sec, more preferably not less than 0.10 g/g/sec, further preferably not less than 0.15 g/g/sec, and most preferably not less than 0.17 g/g/sec. An upper limit of FSR is not particularly limited, but preferably not more than 5.0 g/g/sec, and more preferably not more than 3.0 g/g/sec. The water absorbing resin having FSR of 0.05 g/g/sec or more is preferable, because fluid is sufficiently absorbed and fluid leakage does not occur, for example in the case where such water absorbing resin is used in the water absorbent core.

In the water absorbing resin to be used in the present invention, the amount of residual monomers is controlled to within a range of 0 to 500 wtppm, preferably within a range of 0 to 400 wtppm, and more preferably within a range of 0 to 300 wtppm.

(2) Polymer (B)

A polymer (B) to be used in the water absorbing agent according to the present invention may be selected from polyamine polymers having a hydroxyl group on a main chain. Here, "having a hydroxyl group on a main chain" indicates that the hydroxyl group is bound to the main chain of the polyamine polymer, not to a side chain of the polyamine polymer. The hydroxyl group is preferably bound to a carbon atom on the main chain of the polyamine polymer.

With use of the polyamine polymer having the hydroxyl group bound to the main chain, it is possible to produce a water absorbing agent that is excellent in a balance between a centrifugal retention capacity (CRC) and a saline flow conductivity, and in an absorption speed.

Therefore, when the water absorbing agent is used as a water absorbing agent in a sanitary material (water absorbent core) such as a disposable diaper that has been highly functionalized and made thinner, it is possible to obtain the sanitary material that is excellent in fluid absorbing speed, such fluid as body fluid.

An amount of the hydroxyl group contained in the polyamine polymer with respect to a whole constitutional unit of the polyamine polymer, i.e., with respect to a total amount of nitrogen atoms contained in the main chain of the polyamine polymer, is preferably not less than 30 mol %, more preferably not less than 50 mol %, further preferably not less than 70 mol %, further more preferably not less than 80 mol %, particularly preferably not less than 90 mol %, and most preferably not less than 100 mol %.

Further, a concentration of the nitrogen atoms (concentration of protonatable nitrogen atoms) is preferably 2 to 20 mmol/g, more preferably 3 to 15 mmol/g, further preferably 4 to 10 mmol, and particularly preferably 4 to 8 mmol/g.

The polyamine polymer is preferably a functionalized polymer having, on the main chain thereof, one or more types of functional groups such as primary amino group, secondary amino group, tertiary amino group, quaternary ammonium group, aminochlorohydrin group, aminoalcohol group, and diaminoalcohol group.

Examples of the polyamine polymer encompass a polymer obtainable by polymerizing an amine and an epihalohydrin as essential monomer components. The polymer is described later.

The polymer (B) may be a polymer having a branch structure, and may be a linear polymer. Also, the polymer (B) may have a cross-linked structure, and may have a non-cross-linked structure.

Further, the polymer (B) is preferably soluble in water. Here, "soluble in water" indicates that the amount of the polymer (B) solved in pure water, under atmospheric pressure, 25° C., with respect to 100 g of pure water is preferably not less than 1 g, more preferably not less than 5 g, and most preferably not less than 10 g. Note that there is no upper limit for solubility of the polymer (B) to water, because the higher solubility is more preferable.

Furthermore, in the case where the polymer (B) is solved in water so that the resultant aqueous solution has a solid content of 10%, thus obtained aqueous solution preferably has a viscosity of 0.1 to 1000 (mPa·s), more preferably has a viscosity of 1 to 100 (mPa·s), and further preferably has a viscosity of 1 to 30 (mPa·s), when the aqueous solution is measured by a B-type viscometer (60 rpm/25° C.). It is preferable that the polymer (B) aqueous solution have a viscosity of not more than 1000 (mPa·s) when the solution is measured by the B-type viscometer (60 rpm/25° C.), because the polymer (B) having the viscosity within this range allows more even addition.

A weight-average molecular weight of the polymer (B) is preferably 30,000 to 2,000,000 dalton, more preferably 30,000 to 1,000,000 dalton, further preferably 30,000 to 500,000 dalton, and particularly preferably 40,000 to 500,000 dalton.

<Polymer Obtainable by Reacting an Amine (b2) and an Epihalohydrin (b3) as Essential Monomer Components>

The polymer (B) to be used in the water absorbing agent according to the present invention may be selected from polyamine polymers having a hydroxyl group on a main chain. For example, a polymer, which is obtainable by reacting an amine (b2) and an epihalohydrin (b3), which are monomers and essential components, can be suitably used. Note that, "having a hydroxyl group on a main chain" means that it is preferable that the hydroxyl group be directly bound to a carbon atom of the main chain.

Use of the above polymer makes it possible to produce a water absorbing agent that is excellent in a balance between a centrifugal retention capacity (CRC) and a saline flow conductivity (SFC) and has improved absorption speed within a range of predetermined weight-average molecular weights. Further, it is possible to obtain a water absorbing agent that is rarely colored and excellent in color stability even over long-term storage under a condition of high humidity and high temperature, and is also excellent in handlability. Particularly, by reducing an amount of the primary amino group contained in the main chain of the polyamine polymer, it is possible to obtain a water absorbing agent that is less colored and more excellent in color stability over long-term storage.

The polymer (B) is preferably a cationic polymer, in which the amine (b2) is one or two or more types of amines selected from the group consisting of primary amine, secondary amine, tertiary amine, polyalkylene polyamine, and alkanolamine.

In the polymer (B), number of moles of the epihalohydrin (b3) used for obtaining the polymer (B) with respect to a total amount of nitrogen atoms of the amine (b2) is preferably 0.8 to 2.0 equivalents, more preferably 0.9 to 1.5 equivalents, and further preferably 1.0 to 1.2 equivalents. It is preferable that the number of moles of the epihalohydrin (b3) used for obtaining the polymer (B) with respect to the total amount of nitrogen atoms be not less than 0.8 equivalents, because molecular weight of the polymer can be increased. It is preferable that the number of moles of the epihalohydrin (b3) with respect to the total amount of nitrogen atoms be not more than 2.0 equivalents, because the molecular weight of the polymer can be controlled.

The polymer (B) is preferably a functionalized polymer having, on a main chain thereof, one or two or more types of functional groups such as primary amino group, secondary amino group, tertiary amino group, quaternary ammonium group, aminochlorohydrin group, aminoalcohol group, and diaminoalcohol group. Especially preferred among those are functionalized polymers containing the secondary amino group, because this makes it possible to reduce the primary amino group content so as to prevent the water absorbing agent from being colored. The primary amino group content with respect to the entire amines (b2) in the polymer (B) is preferably not more than 10 mol %, further preferably not more than 5 mol %, and particularly preferably not more than 1 mol %.

The amine that can be used as the amine (b2) is not limited to a particular kind as long as the amine has, within a molecule, at least one amino group that can react with epihalohydrin. However, the amine is preferably one or two or more types of amines selected from the group consisting of primary amine, secondary amine, tertiary amine, polyalkylene polyamine, and alkanolamine.

Further, the amine (b2) more preferably contains at least one type of a secondary amine (b2-1). It is preferable that the amine (b2) have at least one type of the secondary amine (b2-1), because this makes it possible to obtain a water absorbing agent that is excellent in the color stability.

Furthermore, the amine (b2) may contain (i) the secondary amine (b2-1) and (ii) an amine other than the secondary amine (b2-1). The amines other than the secondary amine (b2-1) is, for example, one or two or more types of amines (hereinafter referred to as "primary amine or the like") (b2-2) selected from the group consisting of primary amine, tertiary amine, polyalkylene polyamine, and alkanolamine.

A ratio of the secondary amine (b2-1) to the entire amine (b2) before reaction, that is, the ratio of the secondary amine (b2-1) used for obtaining the polymer (B) to the entire amine (b2), is preferably not less than 1 mol % but not more than 100 mol %, more preferably not less than 50 mol % but not more than 100 mol %, further preferably not more than 80 mol % but not more than 100 mol %, and particularly preferably not less than 90 mol % but not more than 100 mol %. It is preferable that the ratio of the secondary amine (b2-1) to the entire amine (b2) be not less than 1 mol % but not more than 100 mol %, because such water absorbing agent is excellent in color stability.

Examples of the secondary amine (b2-1) encompass: aliphatic secondary amine, aromatic secondary amine, alicyclic secondary amine, and cyclic secondary amine. Especially preferred among those is the aliphatic secondary amine. One type of the secondary amine may be used, or two or more types of the secondary amines may be used in combination. It is preferable to use the aliphatic secondary amine as the secondary amine (b2-1), because such water absorbing agent is excellent in color stability.

Examples of the aliphatic secondary amine encompass dialkylamine having an alkyl group whose carbon number is 1 to 20 or a phenylalkyl group whose carbon number is 7 to 20. More specifically, examples of the aliphatic secondary amine encompass: dimethylamine, diethylamine, dipropylamine, methyl ethyl amine, methyl propyl amine, methyl butyl amine, methyl octyl amine, methyl lauryl amine, and dibenzylamine. Especially preferred among these in view of hydrophilicity and water solubility of the polymer obtained are dimethylamine and/or diethylamine, and particularly preferred is dimethylamine.

Examples of the aromatic secondary amine encompass: N-alkylaniline, N-alkyltoluidine, or N-alkylnaphthylamine, which is formed in such a manner that, for example, a nitrogen atom is bound with an alkyl group whose carbon number is 1 to 20 or with a phenylalkyl group whose carbon number is 7 to 20. Specifically, examples of the aromatic secondary amine encompass: N-methylaniline, N-ethylaniline, N-butylaniline, N-pentylaniline, N-hexylaniline, N-octylaniline, N-decylaniline, N-laurylaniline, N-benzylaniline, N-methyltoluidine, N-ethyltoluidine, N-propyltoluidine, N-butyltoluidine, N-pentyltoluidine, N-hexyltoluidine, N-octyltoluidine, N-decyltoluidine, N-lauryltoluidine, N-benzyltoluidine, N-methylnaphthylamine, N-ethylnaphthylamine, N-propylnaphthylamine, N-butylnaphthylamine, N-pentylnaphthylamine, N-hexylnaphthylamine, N-octylnaphthylamine, N-decylnaphthylamine, N-laurylnaphthylamine, and N-benzylnaphthylamine. Especially preferred among these N-alkylanilines are N-methylaniline and/or N-ethylaniline.

Other examples of the aromatic secondary amine encompass: amine formed in such a manner that two aromatic rings are bound to a nitrogen atom. Specifically, other examples of the aromatic secondary amine encompass: diphenylamine, N-phenyl-o-toluidine, N-phenyl-m-toluidine, N-phenyl-p-toluidine, N-toluoyl-o-toluidine, N-toluoyl-m-toluidine, N-toluoyl-p-toluidine, N-phenylaminopyridine, N-toluoylaminopyridine, N-phenylnaphthylamine, and N-toluoylnaphthylamine. Especially preferred among these amines is diphenylamine.

Examples of the alicyclic secondary amine encompass: amine formed in such a manner that one or two carbocyclic ring(s) are bound to a nitrogen atom. Specifically, examples of the alicyclic secondary amine encompass: N-alkylcyclohexylamine such as N-methylcyclohexylamine, N-ethylcyclohexylamine, N-propylcyclohexylamine, N-butylcyclohexylamine, N-hexylcyclohexylamine, N-octylcyclohexylamine, N-decylcyclohexylamine, and N-laurylcyclohexylamine; N-alkylcyclooctylamine such as N-methylcyclooctylamine, N-ethylcyclooctylamine, N-propylcyclooctylamine, N-butylcyclooctylamine, N-hexylcyclooctylamine, N-octylcyclooctylamine, N-decylcyclooctylamine, and N-laurylcyclooctylamine; and dicycloalkylamine such as dicyclohexylamine and dicyclooctylamine. Especially preferred among these alicyclic secondary amines is dicyclohexylamine.

Examples of the cyclic secondary amine encompass: piperazine, piperidine, and methylpiperidine.

Next, the primary amine or the like (b2-2) is described as follows. Described below are primary amine, tertiary amine, polyalkylene polyamine, and alkanolamine, which can be used as the primary amine or the like (b2-2).

Examples of the primary amines encompass: aliphatic primary amine, aromatic primary amine, and alicyclic primary amine. One type of the primary amines may be used, or two or more types of the primary amines may be used in combination.

Examples of the aliphatic primary amine encompass: primary amine formed in such a manner that, for example, a nitrogen atom is bound with an alkyl group whose carbon number is 1 to 20, or with an phenylalkyl group whose carbon number is 7 to 20. Specifically, examples of the aliphatic primary amine encompass: methylamine, ethylamine, propylamine, isopropylamine, allylamine, n-butylamine, sec-butylamine, tert-butylamine, pentylamine, 2-aminopentane, hexylamine, 2-aminohexane, 3-aminohexane, monooctylamine, and benzylamine. Especially preferred among the aliphatic primary amines are methylamine, ethylamine, propylamine, isopropylamine, n-butylamine, sec-butylamine, tert-butylamine, or the like.

Examples of the aromatic primary amine encompass: primary amine formed in such a manner that a nitrogen atom is bound with a benzene ring, with a condensed benzene ring, or with a conjugated aromatic ring. Specifically, examples of the aromatic primary amine encompass: aniline, toluidine, biphenylamine, naphthylamine, aminopyridine, and aminopicoline.

An example of the alicyclic primary amines is primary amine formed in such a manner that a nitrogen atom is bound with a carbocyclic ring. Specifically, examples of the alicyclic primary amines encompass: cyclohexylamine and cyclooctylamine.

Examples of the tertiary amines encompass: aliphatic tertiary amine, aromatic tertiary amine, and alicyclic tertiary amine. One type of the tertiary amines may be used, or two or more types of the tertiary amines may be used in combination.

Examples of the aliphatic tertiary amine encompass: amine formed in such a manner that, for example, a nitrogen atom is bound with three alkyl groups whose carbon number is 1 to 20, or with three phenylalkyl groups whose carbon number is 7 to 20. Specifically, examples of the aliphatic tertiary amine encompass: trimethylamine, triethylamine, tripropylamine, triisopropylamine, tri-n-butylamine, tri-sec-butylamine, tri-tert-butylamine, tripentylamine, trihexylamine, trioctylamine, and tribenzylamine. Especially preferred among these aliphatic tertiary amines are trimethylamine and triethylamine.

Examples of the aromatic tertiary amine encompass: tertiary amine formed in such a manner that a nitrogen atom is bound with at least one ring selected from the group consisting of a benzene ring, condensed benzene ring, and conjugated aromatic ring. Specifically, examples of the aromatic tertiary amine encompass: dimethylaniline, diethylaniline, dimethyltoluidine, diethyltoluidine, N-methyldiphenylamine, N-ethyldiphenylamine, N-methylditolylamine, N-ethylditolylamine, and triphenylamine.

An example of the alicyclic tertiary amines is tertiary amine formed in such a manner that a nitrogen atom is bound with at least one carbocyclic ring. Specifically, examples of the alicyclic tertiary amines encompass: dimethylaminocyclohexane, dicyclohexylaminomethane, dimethylaminocyclooctane, dicyclooctylaminomethane, tricyclohexylamine, and tricyclooctylamine.

An example of the polyalkylenepolyamines is a compound including at least two or more primary amino groups and at least one or more secondary amino groups in a molecule thereof. Typical examples of the compound encompass: diethylenetriamine, triethylenetetramine, tetraethylenepentamine, pentaethylenehexamine, heptaethyleneoctamine, nonaneethylendecamine, and triethylenebis(trimethylene)hexamine. One type of the polyalkylenepolyamines may be used, or two or more types of the polyalkylenepolyamines may be used in combination.

Examples of the alkanolamines encompass amines including a hydroxyl group. Specifically, examples of the alkanolamines encompass: monoethanolamine, diethanolamine, N-methyethanolamine, triethanolamine, N,N-diethylethanolamine, N,N-dimethylethanolamine, N-methyldiethanolamine, N,N-dibutylethanolamine, and N-(2-aminoethyl)ethanolamine. One type of the alkanolamines may be used, or two or more types of the alkanolamines may be used in combination.

In addition to the primary amine; tertiary amine; polyalkylenepolyamine; and alkanolamine, diamine including one or more carbocyclic ring(s) may also be used as the primary amine or the like (b2-2). Examples of the diamine encompass: 1,3-diaminocyclohexyl, 1,4-diaminocyclohexyl, 4,4'-diamino-3,3'-dimethyldicyclohexane, 4,4'-bis(para-aminocyclohexyl)methane, isophorone diamine, 1,3(or 2,4)-bis-(aminomethyl)cyclohexane, N-aminopropylcyclohexylamine, octahydro-4,7-methanoindene-1(2), 5(6)-dimethanamine, 2,2'-bis-(4-aminocyclohexyl)methane, 4,4'-oxybis(cyclohexylamine), 4,4'-sulfonbis(cyclohexylamine), 1,3,5-triaminocyclohexane, and 2,4'- or 4,4'-diamino-3,3',5,5'-tetraalkyldicyclohexylalkane.

Further, alkylenediamine may also be used as the primary amine or the like (b2-2). Examples of the alkylenediamine encompass: ethylenediamine, trimethylenediamine, and propylenediamine.

As the epihalohydrin (b3), epihalohydrin such as epichlorohydrin, epibromohydrin, and methylepichlorohydrin may preferably be used. One type of the epihalohydrins may be used, or two or more types of the epihalohydrins may be used in combination. Especially preferred among these epihalohydrins is epichlorohydrin.

The weight-average molecular weight of the polymer (B) is preferably 30,000 to 2,000,000 dalton, more preferably 30,000 to 1,000,000 dalton, further preferably 30,000 to 500,000 dalton, and particularly preferably 40,000 to 500,000 dalton.

The polymer (B) having the weight-average molecular weight of not less than 30,000 is preferable, because it is possible to produce a water absorbing agent having an improved absorption speed, with use of the polymer. Also, the polymer (B) having the weight-average molecular weight of not more than 2,000,000 is preferable, because it is possible to prevent uneven addition due to high viscosity.

Note that in this description, the weight-average molecular weight is measured by a publicly known method such as GPC (Gel Permeation Chromatography) and static light scattering.

The polymer (B) is a polymer whose main components are two components, namely the amine (b2) and the epihalohydrin (b3) as monomers, however the polymer (B) may contain a component (b4) as a third component, as a constitutional unit (raw material) of the polymer (B). The amount of the component (b4) with respect to the whole amount of the polymer (B) is 0 to 60 mass %, preferably 0 to 40 mass %, more preferably 0 to 20 mass %, particularly preferably 0 to 10 mass %. The component (b4) is not limited to a particular kind, but for example, the component (b4) is alkylene oxide whose carbon number is 2 to 20; aromatic oxide; alkyl glycidyl ether whose carbon number is 2 to 20; silane coupling agent; aliphatic acid whose carbon number is 2 to 20; or hydroxyfatty acid whose carbon number is 2 to 20.

Further, the polymer (B) may contain an unreacted amine and/or epihalohydrin, but the ratio of the total amount of the unreacted amine and epihalohydrin contained in the polymer (B) is preferably not more than 20 mass %, more preferably not more than 10 mass %, further preferably not more than 5 mass %, further more preferably not more than 1 mass %, and particularly preferably, substantially 0 mass %.

The polymer (B) can be reacted in such a manner that the amine (b2) is solved in water-soluble solvent such as water, the epihalohydrin (b3) is dropped to the resultant solution, and thereafter the solution is heated at 30 to 100° C., and more preferably at 60 to 100° C. Note that this process of "reaction" must include a polymerization reaction.

The polymer may be produced by a publicly known synthesis method as disclosed in the Specification of U.S. Pat. No. 4,088,613 and the like.

A method described in Synthesis Example of the present application provides a high-molecular-weight polymer, by dropping epichlorohydrin to ammonia water over several hours. In contrast, with a method disclosed in Japanese Patent Application Publication, Tokukaihei, No. 7-10893, in which the epichlorohydrin is mixed in at once so as to be reacted, it is not possible to sufficiently raise the molecular weight, or it is substantially not possible to obtain the high-molecular-weight polymer.

Examples of the commercially available polymer (B) encompass: UNISENCE KHE 103L made by SENKA corporation (hexamethylenediamin/epichlorohydrin resin, pH of the 1% aqueous solution is approximately 5.0, viscosity is 20 to 50 (mPa·s), the aqueous solution having a concentration of solid content of 50 mass %), and UNISENCE KHE 104L (dimethylamine/epichlorohydrin resin, pH of the 1% aqueous solution is approximately 7.0, viscosity is 1 to 10 (mPa·s), the aqueous solution having a concentration of solid content of 20 mass %).

<Polymer Obtainable by Reacting an Ammonia (b1), Amine (b2), and Epihalohydrin (b3) as Essential Monomer Components>

Furthermore, as the polymer (B) to be used in the water absorbing agent according to the present invention, a cationic polymer can also be suitably used. The cationic polymer is obtainable by reacting an ammonia (b1), an amine (b2), and an epihalohydrin (b3) as essential monomer components.

With use of the above polymer, it is possible to produce a water absorbing agent that is excellent in a balance between a centrifugal retention capacity (CRC) and a saline flow conductivity (SFC) and has improved absorption speed.

Further, the above polymer provides such an effect that it is possible to produce a water absorbing agent that has excellent absorption speed, even if a molecular weight of the polymer is small or large. That is, the polymer may have a wide range of molecular weights, from small to large. Thus, the molecular weight need not be rigorously controlled so as to synthesize the above polymer, and therefore it is possible to easily produce the polymer (B).

Furthermore, by reducing an amount of the primary amino group that is contained in the main chain of the polyamine polymer, it is possible to obtain a water absorbing agent that is more excellent in color stability so that it will not be colored much over long-term storage. The primary amino group content with respect to the entire amines (b2) in the polymer (B) is preferably not more than 10 mol %, further preferably not more than 5 mol %, and particularly preferably not more than 1 mol %.

In the polymer (B), a molar ratio (b1:b2) of the ammonia (b1) to the amine (b2) used for obtaining the polymer (B) is preferably (more than 0 but not more than 2): (not less than 8 but less than 10), and more preferably 0.01:9.99 to 2:8. It is preferable that the molar ratio of the ammonia (b1) to the amine (b2) used for obtaining the polymer (B) be within the above range, because it is possible to improve color stability.

The polymer (B) is preferably a cationic polymer, in which the amine (b2) is one type or two or more types of amines selected from the group consisting of primary amine, secondary amine, tertiary amine, polyalkylene polyamine, and alkanolamine.

Further, the number of moles of the epihalohydrin (b3) used for obtaining the polymer (B) with respect to a total amount of nitrogen atoms of the ammonia (b1) and the amine (b2) is preferably 0.5 to 3 equivalents, more preferably 0.8 to 2.0 equivalents, further preferably 0.8 to 1.2 equivalents, particularly preferably 0.9 to 1.2 equivalents, and most preferably 1.0 to 1.2 equivalents. It is preferable that the number of moles of the epihalohydrin (b3) used for obtaining the polymer (B) with respect to the total amount of nitrogen atoms be not less than 0.5 equivalents, because this prevents the molecular weight from being reduced. It is preferable that the number of moles of the epihalohydrin (b3) with respect to the total amount of nitrogen atoms be not more than 3 equivalents, because it is easier to control the molecular weight.

The polymer (B) is preferably a functionalized polymer having one or two or more types of functional groups, such as primary amino group, secondary amino group, tertiary amino group, quaternary ammonium group, amino chlorohydrin group, aminoalcohol group, and diaminoalcohol group. Especially preferred among those are functionalized polymers containing the secondary amino group and the quaternary ammonium group.

The ammonia (b1) may be selected from any ammonia and ammonia water. The ammonia may be liquid ammonia, besides ammonia in the form of a gas. Further, in the case where the ammonia water is used, ammonia concentration in the ammonia water is not particularly limited.

Amines that can be used as the amine (b2) are the same as described in <Polymer obtainable by reacting amines (b2) and epihalohydrins (b3) as essential monomer components>, except for the ratio of the preferred secondary amine (b2-1). Therefore the description of the amines that can be used as the amine (b2) is omitted here. In the polymer (B) obtainable by reacting the ammonia (b1), the amine (b2), and the epihalohydrin (b3) as essential monomer components, the ratio of the secondary amine (b2-1) to the entire amines (b2) before the reaction is preferably not less than 1 mol % but not more than 100 mol %, more preferably not less than 50 mol % but not more than 100 mol %, further preferably not less than mol % but not more than 100 mol %, and particularly preferably not less than 90 mol % but not more than 100 mol %. Further, the ratio of the secondary amine (b2-1) to the entire amines (b2) after the reaction is preferably 0 mol % or more but not more than 50 mol %, more preferably 0 mol % or more but not more than 30 mol %, and further preferably 0 mol % or more but not more than 20 mol %. It is preferable that the ratio of the secondary amine (b2-1) to the entire amines (b2) before the reaction be not less than 1 mol % but not more than 100 mol %, because this amount is effective in preventing the water absorbing agent from being colored.

The weight-average molecular weight of the polymer (B) is preferably 5,000 to 2,000,000 dalton, more preferably 20,000 to 1,000,000 dalton, further preferably 30,000 to 1,000,000 dalton, further more preferably 30,000 to 500,000 dalton, particularly preferably 40,000 to 500,000 dalton, and most preferably 50,000 to 500,000 dalton.

It is preferable that the weight-average molecular weight of the polymer (B) be not less than 5,000, because it is possible to prevent the polymer (B) from being penetrated into the water absorbing resin. Also, it is preferable that the weight-average molecular weight of the polymer (B) be not more than 2,000,000, because it is possible to prevent the polymer (B) from being added unevenly due to high viscosity.

The polymer (B) is a polymer whose essential components are three components consisting of the ammonia (b1), the amine (b2), and the epihalohydrin (b3) as monomers, however the polymer (B) may contain a component (b4) as the fourth component, as a constitutional unit (raw material) of the polymer (B). The amount of the component (b4) with respect to the entire polymer (B) is 0 to 60 mass %, preferably 0 to 40 mass %, more preferably 0 to 20 mass %, particularly preferably 0 to 10 mass %. The component (b4) is not limited to a particular kind, however examples of the component (b4) encompass: alkylene oxide whose carbon number is 2 to 20; aromatic oxide, alkyl glycidyl ether whose carbon number is 2 to 20; silane coupling agent; aliphatic acid whose carbon number is 2 to 20; and hydroxyfatty acid whose carbon number is 2 to 20. Further, the polymer (B) according to the present invention may contain unreacted ammonia, amine, and/or epihalohydrin. However, the ratio of the total amount of the unreacted ammonia, amines, and epihalohydrins contained in the polymer (B) is preferably not more than 20 mass %, more preferably not more than 10 mass %, further preferably not more than 5 mass %, further more preferably not more than 1 mass %, and particularly preferably, substantially 0 mass %.

The polymer (B) can be reacted in such a manner that the ammonia (b1) is solved in water-soluble solvent such as water, the epihalohydrin (b3) is dropped to the resultant solution, and thereafter, the solution is heated at 30 to 100° C.

The polymer (B) may be produced by a publicly known method disclosed in the Specification of U.S. Pat. No. 4,088,613 and the like.

Examples of the commercially available polymer (B) encompass: UNISENCE KHE100L, UNISENCE KHE101L, and UNISENCE KHE102L (made by SENKA corporation: dimethylamine/ammonia/epichlorohydrin resin, average molecular weight is approximately 70,000 (reference value), pH of 1% aqueous solution is approximately 6, viscosity is 100 to 300 (mPa·s), the aqueous solution having a concentration of solid content of 50 mass %), UNISENCE KHE1000L (dimethylamine/ammonia/epichlorohydrin resin, average molecular weight is approximately 280,000 (reference value), pH of 1% aqueous solution is approximately 4.5, viscosity is 1000 to 3000 (mPa·s), the aqueous solution having a concentration of solid content of 50 mass %), Nalco7607 and Nalco8850 (made by Nalco Industries, Northwich, UK), and Disperfloc C-500 (made by Dispersol San Luis S.A., Buenos Aires, Argentina).

(3) Other Additives

In addition to the water absorbing resin (A) and the polymer (B), water is normally contained as a main component. Furthermore, other additives are used as needed. Examples of other additives that can be used in the present invention include water-soluble polyvalent metal salt, water-insoluble polyvalent metal salt, water-insoluble inorganic fine particles, a water-soluble polymer such as polyethylene glycol, a surfactant, hydroxycarboxylic acid, chelate agent, reductant agent, antioxidizing agent, phosphorus compound, and a polymer emulsion. The additives can be added in a form of aqueous solution, aqueous dispersion, or powder. Further, one type of the additive can be used, and two or more types of the additives can be used in combination.

Examples of the water-soluble polyvalent metal salt encompass aluminum chloride, polyaluminum chloride, aluminum sulfate, aluminum nitrate, bis aluminum potassium sulfate, bis aluminum sodium sulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate, ammonium zirconium carbonate, potassium zirconium carbonate, and sodium zirconium carbonate. These water-soluble polyvalent metal salts can be preferably used. From a viewpoint of solubility in an aqueous liquid that is absorbed in the water absorbing agent, more preferably, the water-soluble polyvalent metal salt contains crystalline water. These water-soluble polyvalent metal salts may be used solely or in combination of two or more of them. Aluminum sulfate (preferably aqueous solution) can be used most preferably among others.

Examples of the water-insoluble polyvalent metal salt encompass: aluminum hydroxide, aluminum lactate, aluminum phosphate, barium sulfate, barium phosphate, barium carbonate, calcium pyrophosphate, calcium phosphate, calcium carbonate, ferrous hydroxide, ferrous phosphate, ferric pyrophosphate, ferrous carbonate, magnesium pyrophosphate, magnesium phosphate, cuprous chloride, manganese hydroxide, manganese sulfate, nickel hydroxide, nickel phosphate, lead sulfate, zinc oxide, lead phosphate, zinc hydroxide, and zinc pyrophosphate.

A total content of the water-soluble polyvalent metal salt and the water-insoluble polyvalent metal salt relative to the entire water absorbing agent is preferably in a range of 0 mass % to 5 mass %, more preferably in a range of 0.001 mass % to 5 mass %, and most preferably in a range of 0.01 mass % to 1 mass %. Adding the water-soluble polyvalent metal salt and/or the water-insoluble polyvalent metal salt within any one of the ranges further improves the centrifugal retention capacity (CRC) and saline flow conductivity (SFC) of the water absorbing agent.

Further, the water absorbing agent according to the present invention can contain an organic acid polyvalent metal salt of the amount as stated above, in order to improve powder fluidity and to prevent blocking at the time of moisture absorption. Suitably used as the organic acid polyvalent metal salt and a mixing method are, for example, the polyvalent metal salts and the mixing methods disclosed in PCT International Application No. PCT/JP2004/1355, PCT/JP2004/1007, PCT/JP2004/1294, and PCT/JP2004/9242. The organic acid polyvalent metal salt (PCT/JP2004/1355) that can be used in the present invention, the organic acid polyvalent metal salt having 7 or more carbon numbers within a molecule, is preferably metal salts other than alkali metal salts of organic acid, such as aliphatic acid, petroleum acid, and polymer acid.

Further, at least 50 mass % of the water-insoluble inorganic fine particles preferably have a particle size of 10 to 1,000,000 nm. Examples of the water-insoluble inorganic fine particles encompass: mineral products such as talc, kaolin, fuller's earth, bentonite, activated earth, barite, natural asphaltum, a strontium ore, ilmenite, and pearlite; polyvalent metal oxide and polyvalent metal hydroxide; hydrophilic amorphous silica (e.g., ReolosilQS-20 (dry method, produced by Tokuyama Corporation), and Sipernat22S and Sipernat2200 (precipitation method, produced by Degussa Corporation)); and oxide composite such as a composite of silicon oxide, aluminum oxide, and magnesium oxide (e.g., Attadel #50, produced by Engelhard Corporation), a composite of silicon oxide and aluminum oxide, and a composite of silicon oxide and magnesium oxide. As the water-insoluble inorganic fine particles, hydrophilic amorphous silica can be used most preferably among others.

The water-insoluble inorganic fine particle content relative to the entire water absorbing agent is preferably in a range of 0 mass % to 5 mass %, more preferably in a range of 0.01 mass % to 1 mass %, and most preferably in a range of 0.1 mass % to 0.5 mass %. Adding the water-insoluble inorganic fine particles within any one of the ranges further improves a handling property (fluidity) and SFC of the water absorbing agent.

Examples of the surfactant encompass: an anionic surfactant, a nonionic surfactant, a cationic surfactant, and an ampholytic surfactant. These surfactants may be mixed with the water absorbing resin or with the water absorbing agent, at a rate of 0.0001 to 0.01 parts by mass with respect to 100 parts by mass of the water absorbing resin. Preferred as the surfactant is the nonionic surfactant. Specifically, it is possible to employ a surfactant used in U.S. Pat. No. 7,473,739, in the amount described therein.

The hydroxycarboxylic acid is not limited to any particular kind, and alpha-hydroxycarboxylic acids are suitable for use. In this description, the "alpha-hydroxycarboxylic acids" means carboxylic acids, in which a hydroxyl group is bound to a carbon at an alpha position within a molecule. Preferred among the alpha-hydroxycarboxylic acids is a non-polymeric alpha-hydroxycarboxylic acids, and in view of ease and effect of addition, the alpha-hydroxycarboxylic acids preferably have a molecular weight of 40 to 2000, more preferably 60 to 1000, and especially preferably 100 to 500. Further preferably, the alpha-hydroxycarboxylic acids is soluble in water. Examples of the alpha-hydroxycarboxylic acids encompass: lactic acid and salt thereof, citric acid and salt thereof, malic acid and salt thereof, isocitric acid and salt thereof, glyceric acid and salt thereof, and poly alpha-hydroxy acrylic acid and salt thereof. Use of the alpha-hydroxycarboxylic acids as the additive agent can improve a long-term color stability of the water absorbing agent.

The hydroxycarboxylic acid is added to a monomer solution most preferably in advance, but may also be added at any stage of the production of the water absorbing resin.

Adding amount of the hydroxycarboxylic acid is preferably within a range of 1 to 10000 wtppm with respect to the mass of the water absorbing resin.

Preferred as the reductant agent is an inorganic reductant agent, and more preferred is a sulfur-containing inorganic reductant agent. Specific examples of the sulfur-containing inorganic reductant agent encompass: water-soluble thiodialkyl compound, sodium sulfite, potassium sulfite, calcium sulfite, ammonium sulfite, sulfurous acid, sodium hydrogen sulfite, potassium hydrogen sulfite, ammonium hydrogen sulfite, sodium thiosulfate, potassium thiosulfate, ammonium thiosulfate, magnesium thiosulfate, cysteine, and cystine. One type or two or more types of the sulfur-containing inorganic reductant agent may be used. Further, using amount of the reductant agent is not less than 0.001 parts by mass, preferably not less than 0.05 parts by mass, more preferably not less than 0.1 parts by mass with respect to 100 parts by mass of the water absorbing resin, but not more than 1 parts by mass, preferably not more than 0.5 parts by mass, more preferably not more than 0.2 parts by mass with respect to 100 parts by mass of the water absorbing resin.

Preferred as the phosphorus compound is a water-soluble phosphorus compound, and especially preferred among those is water-soluble inorganic phosphorus compound. Specific examples of the water-soluble inorganic phosphorus compound encompass: phosphoric acid, phosphorous acid, hypophosphorous acid, tri phosphoric acid, tripoly phosphoric acid, and salts thereof (for example, disodium hydrogenphosphate, sodium dihydrogen phosphate, trisodium phosphate, or the like). One type of the phosphorus compounds may be used, or two or more types of the phosphorus compounds may be used in combination. Further, preferred as the salt are alkali metal salt such as sodium salt and potassium salt; ammonium salt; amine salt; or the like.

(4) Water Absorbing Agent

The water absorbing agent according to the present invention is a water absorbing agent containing a water absorbing resin (A) and a polymer (B).

The water absorbing agent according to the present invention is more preferably a water absorbing agent containing (i) the water absorbing resin (A) being obtained by polymerizing a water-soluble unsaturated monomer and having an internally crosslinked structure and (ii) the polymer (B). The water absorbing agent according to the present invention is further preferably a water absorbing agent containing (i) the water absorbing resin (A) being obtained by polymerizing a water-soluble unsaturated monomer, and being made in such a manner that the water absorbing resin having the internally crosslinked structure is further surface cross-linked and (ii) the polymer (B). This makes it possible to achieve high CRC and to obtain a liquid permeability-improving effect that cannot be obtained by the conventional.

In the water absorbing agent according to the present invention, locations of the polymer (B) and the water absorbing resin (A) are not particularly limited. However the polymer (B) is located preferably inside or on a surface of the water absorbing resin (A). The polymer (B) is located more preferably on the surface of the water absorbing resin (A).

The water absorbing agent according to the present invention contains water of preferably 1 to 20 mass %, more preferably 1 to 10 mass %, further preferably 1 to 5 mass %, with respect to the whole amount of the water absorbing agent. Note that the amount of the water contained in the water absorbing agent is specified by a solid content amount as described later. It is preferable that the amount of water be not more than 20 mass %, because with this amount, it is possible to keep the centrifugal retention capacity (CRC) without reducing the CRC. Further, it is preferable that the amount of water be not less than 1 mass %, because the water absorbing agent containing this amount of water is excellent in handlability.

The water absorbing agent according to the present invention is preferably in a particle shape. In the case where the water absorbing agent is in a particle shape, a weight-average particle size is preferably not less than 100 μm but not more than 600 μm, more preferably not less than 200 μm but not more than 500 μm, further preferably not less than 300 μm but not more than 450 μm, further more preferably not less than 300 μm but not more than 400 μm. It is preferable that the particles be within the above ranges, because the water absorbing agent becomes excellent in liquid permeability and fluid absorbing speed into the water absorbing agent. In other words, it is preferable because: the water absorbing agent is excellent in the fluid absorbing speed, and therefore fluid leakage does not occur, when the water absorbing agent is used in a disposable diaper or the like.

Furthermore, in the water absorbing agent of the present invention, the polymer (B) is preferably present on the surface of the water absorbing resin. The amount of the water absorbing agent having the particle size of not less than 175 μm but not more than 710 μm is preferably not less than 50 mass %, and more preferably not less than 80 mass %.

Further, in the case where the water absorbing agent is in the shape of particle, the amount of particles having a size which can pass through a sieve with openings of 150 μm with respect to the whole water absorbing agent is preferably not more than 5 mass %, more preferably not more than 3 mass %, and most preferably not more than 1 mass %. If the amount of particles having a size which can pass through a sieve with openings of 150 μm is not more than 5 mass %, it is possible to prevent a safety and health problems caused by flying particles at the time of production. Also, it is possible to prevent a reduction in properties of the water absorbent core obtained.

Furthermore, in the case where the water absorbing agent is in a shape of particle, a logarithmic standard deviation (σζ) of a particle size distribution is preferably not less than 0.20 but not more than 0.50, and more preferably not less than 0.30 but not more than 0.40. It is preferable that the logarithmic standard deviation (σζ) of a particle size distribution be within the above range, because the water absorbing agent will have improved liquid permeability and become excellent in the fluid absorbing speed into the water absorbent core.

Moreover, a CRC of the water absorbing agent is preferably not less than 5 (g/g), more preferably not less than 15 (g/g), and further preferably not less than 25 (g/g). An upper limit of the CRC is not particularly limited, however is preferably not more than 70 (g/g), more preferably not more than 50 (g/g), and further preferably not more than 40 (g/g). With the CRC of not less than 5 (g/g), the water absorbing agent is suitable for use in a sanitary material such as a disposable diaper, because an absorbing amount is large. Further, with the centrifugal retention capacity (CRC) of not more than 70 (g/g), it is possible to obtain a water absorbing agent that is excellent in the fluid absorbing speed into the water absorbent core, when the water absorbing agent is used in the water absorbent core.

An SFC of the water absorbing agent according to the present invention is preferably not less than 30 ($cm^3 \cdot s \cdot 10^{-7} \cdot g^{-1}$), more preferably not less than 50 ($cm^3 \cdot s \cdot 10^{-7} \cdot g^{-1}$), further preferably not less than 100 ($cm^3 \cdot s \cdot 10^{-7} \cdot g^{-1}$), further more preferably not less than 150 ($cm^3 \cdot s \cdot 10^{-7} \cdot g^{-1}$), particularly preferably not less than 170 ($cm^3 \cdot s \cdot 10^{-7} \cdot g^{-1}$), and most preferably not less than 200 ($cm^3 \cdot s \cdot 10^{-7} \cdot g^{-1}$). With the SFC of not less than 30 ($cm^3 \cdot s \cdot 10^{-7} \cdot g^{-1}$), it is possible to obtain a water absorbing agent that is excellent in the fluid absorbing speed into the water absorbent core, when the water absorbing agent is used in the water absorbent core. The upper limit of the SFC if not particularly limited, however is preferably not more than 3000 ($cm^3 \cdot s \cdot 10^{-7} \cdot g^{-1}$). With the upper limit of the SFC of not more than 3000 ($cm^3 \cdot s \cdot 10^{-7} \cdot g^{-1}$), it is possible to prevent the fluid leakage in the water absorbent core, when the water absorbing agent is used in the water absorbent core.

In the water absorbing agent according to the present invention, an absorbency against pressure of 4.83 kPa (AAP) is preferably not less than 8 (g/g), more preferably not less than 16 (g/g), and further preferably not less than 20 (g/g). The upper limit of the AAP is not particularly limited, however generally is not more than 30 (g/g). With the absorbency against pressure of 4.83 kPa (AAP) of not less than 8 (g/g), it is possible to obtain a water absorbing agent from which an amount of liquid squeezed out (so-called Re-Wet) is little when a pressure is applied to the water absorbent core, in the case where the water absorbing agent is used in the water absorbent core.

The water absorbing agent according to the present invention preferably has a Vortex water-absorption time of not more than 380 seconds, more preferably not more than 160 seconds, further preferably not more than 100 seconds, and most preferably not more than 70 seconds. The lower limit of the Vortex water-absorption time is not less than 1 second. It is preferable that the Vortex water-absorption time be not more than 380 seconds, because fluid is sufficiently absorbed and fluid leakage does not occur, for example in the case where the water absorbing agent is used in the water absorbent core. Generally, the lower the value of Vortex water-absorption time, the more excellent the absorption speed is. The water absorbing agent having a lower value of Vortex water-absorption time will have improved fluid absorbing speed into the water absorbent core.

Further, particularly (i) in the case where the polymer (B) is a polymer obtainable by reacting the amine (b2) and the epihalohydrin (b3) as essential monomer components, and the weight-average molecular weight of the polymer is 30,000 to 2,000,000 dalton; and (ii) in the case where the polymer (B) is a polymer obtainable by reacting the ammonia (b1), the amine (b2), and the epihalohydrin (b3) as essential monomer components, the absorption speed of the water absorbing resin after the polymer (B) is mixed is preferably more improved than that before the polymer (B) is mixed.

Further, a difference between (the Vortex water-absorption time of the water absorbing agent after the polymer (B) is mixed) and (the Vortex water-absorption time of the water absorbing agent before the polymer (B) is mixed) in this case is not less than 2 seconds, more preferably not less than 4 seconds, and further preferably not less than 6 seconds.

Further, it is preferable for the water absorbing agent according to the present invention to have FSR of not less than 0.05 g/g/sec, more preferably not less than 0.10 g/g/sec, further preferably not less than 0.15 g/g/sec, and most preferably not less than 0.17 g/g/sec. An upper limit of FSR is not particularly limited, but preferably not more than 5.0 g/g/sec, and more preferably not more than 3.0 g/g/sec. The water absorbing agent having FSR of 0.05 g/g/sec or more is preferable, because fluid is sufficiently absorbed and fluid leakage does not occur, for example in the case where the water absorbing resin is used in the water absorbent core.

Furthermore, the FSR of the water absorbing resin after the polymer (B) is mixed is preferably more improved than that before the polymer (B) is mixed in. The FSR after the polymer (B) is mixed in is improved, compared to that before the polymer (B) is mixed in, preferably by not less than 0.02 g/g/sec, more preferably by 0.04 g/g/sec, and further preferably by not less than 0.06 g/g/sec.

In the water absorbing agent according to the present invention, it is preferable that a contact angle of a droplet in dropping 0.9 mass % sodium chloride aqueous solution be not 0° or more but 90° or less, more preferably 70° or less, further preferably 50° or less, and particularly preferably 30° or less. With the arrangement so that the contact angle is 90° or less, the resultant water absorbing agent has high hydrophilicity which results in excellent liquid diffusibility in being used in the water absorbent core. Therefore, liquid is absorbed by a larger area of the water absorbent core, so that also properties of the water absorbent core are improved.

A water-soluble content of the water absorbing agent is preferably not more than 35 mass %, more preferably not more than 25 mass %, and further preferably not more than 15 mass %. It is preferable that the water-soluble content be not more than 35 mass %, because the water absorbing agent will have higher gel strength and become excellent in the liquid permeability. Further, it is preferable because the CRC, AAP and the like do not drop as time elapses, when the water absorbing agent is used in the disposable diaper for an extend period of time.

Further, the water absorbing agent of the present invention is more preferably given a hydrophilic property. In order for the water absorbing agent to have the hydrophilic property, it is possible to suitably use conventionally known methods such as a method in which a water absorbing resin containing, at least on its surface, quadrivalent polyol or polyol of a greater valency is used (WO2005/044915), a method in which inorganic fine particles are added on a water absorbing resin and UV light is irradiated on the water absorbing resin (Japanese Patent Application Publication No. 2006-233008), a method in which a water absorbing agent composition including water-insoluble inorganic fine particles and fulfilling specific conditions is used (Japanese Patent Application No. 2007-504791), a method in which a water absorbing resin including a water-soluble polyvalent metal salt and a urea derivative is used (U.S. Patent Application Publication No. 2005-0288182), and a method in which hydrophilic inorganic fine particles are added (Japanese Patent Application No. 2006-188668).

The water absorbing agent according to the present invention can be suitably used for sanitary materials such as disposable diapers. When the water absorbing agent is used in a sanitary material such as a disposable diaper, the water absorbing agent preferably keeps extremely clean and white state even over long-term storage under high humidity and high temperature. The state over long-term storage can be checked by performing a test for promoting color stability over long-term storage. The test for promoting color stability over long-term storage is performed in such a manner that the water absorbing agent is exposed to an atmosphere of 70±1° C. of temperature and 65±1% of relative humidity for seven days, and thereafter an L value (Lightness) in Hunter's Lab color system on the water absorbing agent is measured by a spectral colorimeter. In measuring the L value (Lightness) in Hunter's Lab color system of the water absorbing agent that has been subjected to the test for promoting color stability over long-term storage with use of the spectral colorimeter, the water absorbing agent according to the present invention preferably has the L value of at least 70. Note that the upper limit of the L value is generally 100, however the L value of 70 substantially does not cause any problem in actual use. Further, a b value is preferably 0 to 15, and an a value is preferably −3 to 3.

Especially in the case where the polymer (B) is a polymer that is obtainable by reacting the amine (b2) and the epihalohydrin (b3) as essential monomer components, the water absorbing agent according to the present invention can keep cleaner and whiter state even over long-term storage under a condition of high humidity and high temperature. In this case, in measuring the L value (Lightness) in Hunter's Lab color system of the water absorbing agent that has been subjected to the test for promoting color stability over long-term storage with use of the spectral colorimeter, the water absorbing agent according to the present invention preferably has the L value of at least 70, more preferably not less than 74, and further preferably not less than 78. Note that the upper limit of the L value is generally 100, however the L value of 70 substantially does not cause any problem in actual use. Further, the water absorbing agent preferably has the b value of 0 to 15, more preferably 0 to 12, and further preferably 0 to 10. Furthermore, the water absorbing agent preferably has the a value of −3 to 3, more preferably −2 to 2, and further preferably −1 to 1.

Further, the water absorbing agent according to the present invention has a YI value (the YI value after 7-day exposure in atmosphere at 70±1° C. and 65±1% of relative humidity) of preferably not more than 35, more preferably not more than 30, further preferably not more than 25, and most preferably not more than 20. If the water absorbing agent of the present invention has the YI value within the above ranges, it is possible to obtain a water absorbent core that is rarely colored even under a condition of a high temperature and a high humidity in the case where the water absorbing agent of the present invention is used in the water absorbent core of sanitary materials such as disposable diapers.

(5) Method for Producing a Water Absorbing Agent

A method of the present invention for producing a water absorbing agent comprises: mixing a water absorbing resin (A) and a polymer (B). Thus, it is possible to provide a water absorbing agent which is excellent in a balance between a CRC and an SFC. The method of the present invention for producing a water absorbing agent further encompasses a method of producing a water absorbing agent, which contains the water absorbing resin particles (A) having the polymer (B) on surfaces thereof.

The method of the present invention for producing a water absorbing agent may be selected from those including at least a mixing step, wherein the water absorbing resin particles (A) and the polymer (B) are mixed.

In the present invention, the mixing step of mixing the water absorbing resin (A) with the polymer (B) is not limited to any particular method, but may use any one of the following methods: (i) a method for mixing the water absorbing resin (A) with a solution or a dispersion each of which includes the polymer (B); (ii) a method for spraying, onto the water absorbing resin (A), either of the solution or the dispersion, and for mixing the resultant; and (iii) a method for directly adding the polymer (B) to the water absorbing resin (A) for adding, as needed, water, a solvent, a dispersing medium, or the like thereto, and for mixing the resultant.

In the method according to the present invention for producing the water absorbing agent, particularly, it is more preferable that a solution or a dispersion of the polymer (B) is mixed with the water absorbing resin (A). This is preferable because this improves mixing property.

It is further preferable to arrange the method according to the present invention for producing the water absorbing agent so that a solution, an emulsification solution, or a suspension of the polymer (B) is mixed with the water absorbing resin (A).

In a case where a solution of the polymer (B) is mixed with the water absorbing resin (A), a solvent to be used is not limited to any particular kind, but may preferably be, for example, water; alcohols such as ethanol, methanol, propylene glycol, glycerine; or polyethylene glycol. Particularly, it is the most preferable to use water or a mixture solvent of water and the alcohols. Also, it is preferable that a concentration of the polymer (B) in the solution is at least 1 mass % but 100 mass % or less, more preferably at least 10 mass % but 100 mass % or less.

In a case where a suspension of the polymer (B) is mixed with the water absorbing resin (A), a dispersing medium to be used is not limited to any particular kind, but may preferably be, for example, water; an alcohols such as ethanol, methanol, propylene glycol, glycerine; or polyethylene glycol. Also, it is preferable that a concentration of the polymer (B) in the dispersion is at least 1 mass % but 100 mass % or less, more preferably at least 10 mass % but 100 mass % or less. Further, a dispersion agent such as water-soluble polymer and surfactant may be added thereto.

As well as the solution or the suspension, an emulsification solution of the polymer (B) (including an emulsification agent in, for example, water) may be mixed with the water absorbing resin (A). In this case, a dispersing medium to be used is not limited to any particular kind, but may preferable be, for example, water. The emulsification agent is not limited to any particular kind, but may be a nonionic surfactant, a cationic surfactant, or the like. Also, it is preferable that a concentration of the polymer (B) in the emulsification solution is at least 1 mass % but 90 mass % or less, more preferably at least 10 mass % but 90 mass % or less.

It is further preferable to arrange the method according to the present invention for producing the water absorbing agent so that an aqueous solution of the polymer (B) is mixed with the water absorbing resin (A). Also, it is preferable that a concentration of the polymer (B) in the aqueous solution is at least 1 mass % but 90 mass % or less, more preferably at least 10 mass % but 90 mass % or less.

Also, it is not particularly limited in which timing the foregoing mixing step is carried out. It is preferable that the water absorbing resin used in the present invention is the one which has been crosslinked on its surface and/or shallow surface. Therefore, it is preferable that the method according to the present invention for producing the water absorbing agent further includes a surface cross-linking step of cross-linking, by using an surface cross-linking agent, the surface of each of the water absorbing resin. Also, it is preferable that the mixing step is carried out during and/or after the surface cross-linking step.

The timing during and/or after the surface cross-linking step, in which timing the mixing step is carried out, may be: a timing at the point when the water absorbing resin is mixed with the surface cross-linking agent; a timing during a mixture of the water absorbing resin and the surface cross-linking agent is being heated; a timing immediately after the heating of the mixture of the water absorbing resin and the surface cross-linking agent is finished; a timing after cooling of the water absorbing resin obtained by heating the mixture of the water absorbing resin and the surface cross-linking agent; or a plurality of timings described above.

Particularly, in view of a purpose of attaining a high CRC and a more excellent liquid permeability improving effect, it is preferable to carry out the mixing step after the surface cross-linking step. For example, it is more preferable to carry out the mixing step immediately after the heating of the mixture of the water absorbing resin and the surface cross-linking agent is finished or after cooling of the water absorbing resin obtained by heating the mixture of the water absorbing resin and the surface cross-linking agent. Further, it is particularly preferable to carry out the mixing step after the cooling of the water absorbing resin obtained by heating the mixture of the water absorbing resin and the surface cross-linking agent.

Also, it is preferable that the water absorbing resin used in the mixing step is the one which has been heated to a temperature from 30° C. to 80° C., more preferably from 50° C. to 70° C. It is preferable that the water absorbing resin used in the mixing step is at a temperature of 30° C. or more because such water absorbing resin has improved handlability after mixing. Also, it is preferable that the water absorbing resin used in the mixing step is at a temperature of 80° C. or less because such water absorbing resin can prevent itself from being colored because of heat.

Also, the method according to the present invention for producing a water absorbing agent may further include a step for adding an additive such as the foregoing water-soluble polyvalent metal salt and/or water-insoluble inorganic fine particles, or the like. In a case where such an additive is added, the method for adding it is not limited to any particular method, but may be: a method for mixing a solution or a dispersion each of which includes the additive with the water absorbing resin (A) or a mixture of the water absorbing resin (A) and the polymer (B); a method for spraying either of the solution or the dispersion each of which includes the additive and for mixing the resultant; a method for directly adding the additive, for adding, as needed, water, a solvent, a dispersing medium, or the like, and for mixing the resultant.

Also, it is not particularly limited when to add the additive. The additive may be added at the point when the polymer (B) is added. Also, after the water absorbing resin (A) and the polymer (B) are mixed together, the additive may be added to the mixture thus obtained. Among these, in view of a purpose for improving handlability of a water absorbing agent and improving an SFC, it is more preferable that the additive is added after the water absorbing resin (A) and the polymer (B) are mixed together.

Also, in the mixing step and in the step of adding the additive, a concrete method for mixing the water absorbing resin (A), the polymer (B), and, as needed, another additive described above with one another is not particularly limited, but may use any known stirring device. Examples of the stirring device preferably used encompass: a cylindrical mixer; a screw type mixer; a screw type extruder; Turbulizer; a Nauter mixer; a V-type mixer; a double-arm kneader; a fluidization mixer; an air mixer; a rotating disc mixer; a roll mixer; a tumbling mixer; a Loedige mixer; a puddle blender; a ribbon mixer, a rotary blender; a jar tumbler; a Plaujer mixer; and a mortar mixer. Further, the stirring device may include: a heating device for heating a mixture of the water absorbing resin (A), the polymer (B), and, as needed, another additive as described above; or a cooling device for cooling the mixture heated by the heating device. Time any one of the stirring devices takes to carry out a stirring process is not particularly limited, but may preferably be 60 minutes or less, more preferably 30 minutes or less.

Also, the mixture thus obtained may be dried after the mixing step and/or the step of adding the additive. The drying temperature is at least 40° C. but less than 100° C. for a period of 50% or more of the time taken for the drying step, more preferably for a period of substantially all of the whole time taken in the drying step. Carrying out the drying process at such a temperature does not give damage due to heat to the water absorbing agent. Therefore, properties of the water absorbing agent thus obtained are not affected in an adverse way. A drying temperature is determined in accordance with a temperature of a heating medium. However, it is impossible to determine the drying temperature in accordance with a heating medium, for example, in a case of microwave. In such a case, the drying temperature is determined in accordance with a temperature of material. A drying method is not particularly limited, but only needs to have a drying temperature within the above-mentioned range. The drying method may preferably use hot-air drying, windless drying, vacuum drying, infrared-ray drying, microwave drying, or the like.

The drying temperature more preferably ranges from 40° C. to 100° C., further preferably from 50° C. to 90° C. During the drying step, a temperature may be maintained at a certain value or may be changed. However, it is preferable that the temperature is substantially maintained within the above-mentioned range throughout the drying step.

Drying time depends on the surface area of the water absorbing agent, the moisture content, and the type of the dryer. The drying time is selected appropriately so that a target moisture content is obtained. The drying time normally ranges from 10 minutes to 120 minutes, more preferably ranges from 20 minutes to 90 minutes, further preferably from 30 minutes to 60 minutes. A drying time of 10 minutes or longer makes it possible to obtain a sufficiently-dried water absorbing agent having an excellent handlability. A drying time of 120 minutes or shorter does not damage the water absorbing agent, so that the water-soluble content does not increase. As a result, it is possible to attain an effect of improving physical properties.

In the method for producing the water absorbing agent, it is more preferable to mix the polymer (B) and the water absorbing resin particles with each other, after the water absorbing resin particles are subjected to mechanical damage so as to have an irregularly-crushed shape. The water absorbing resin particles having the irregularly-crushed shape can efficiently contain, on its surface, the polymer (B). Thus, it is possible to improve properties of the water absorbing agent thus obtained.

The "mechanical damage" herein means that the water absorbing resin particles are collided with a piece of glass or metal so that the water absorbing resin particles are subjected to a physical shock.

A method for giving mechanical damage to the water absorbing resin particles is not particularly limited, but only needs to be capable of giving a shock to the water absorbing resin particles. Examples of this method encompass a method (paint shaker test, which is described later) for shaking a glass container containing water absorbing resin particles and glass beads so that the water absorbing resin particles are subjected to mechanical damage. Another method for giving mechanical damage to the water absorbing resin particles may be: a method (ball mill) for rotating a cylindrical container containing water absorbing resin particles and a ball or the like; a method for stirring water absorbing resin particles in a stirring device having a stirring wing; a method for passing water absorbing resin particles through a paddle dryer (a heating device or a cooling device each of which has a paddle wing); a method for crushing water absorbing resin particles by means of a crushing device; a method for conveying water absorbing resin particles by air stream; or a method for causing a collision or friction between one particle of a water absorbing agent and another particle of the water absorbing agent.

The polymer (B) is preferably used as a raw material of the water absorbing agent containing the water absorbing resin, in the forgoing method.

(6) Water Absorbent Core

The water absorbent core of the present invention includes the water absorbing agent of the present invention. A combination of the water absorbing agent of the present invention and an appropriate material can be used as, for example, a water absorbent core suitable as a water absorbing layer of the sanitary material. The following explains the water absorbent core according to the present invention.

In the present invention, a water absorbent core is a material made of the water absorbing agent and other materials, and formed in a shape. The water absorbent core is used in a sanitary material for absorbing blood, bodily fluid, urine, and the like. Examples of the sanitary materials may encompass a disposable diaper, a sanitary napkin, an incontinence pad, a medical pad, and the like. Other material used for the water absorbent core may encompass a cellulose fiber. A specific example of such a cellulose fiber encompasses, for example, a wood pulp fiber such as a mechanical pulp made from wood, a chemical pulp, a semi-chemical pulp, and a dissolving pulp; an artificial cellulose fiber such as rayon and acetate, and the like. A more preferable cellulose fiber is a wood pulp fiber. These cellulose fibers may partially contain a synthesized fiber such as a nylon and a polyester. When the water absorbing agent of the present invention is used as a part of the water absorbent core, content of the water absorbing agent in the water absorbent core is preferably 20 mass % or more, more preferably 30 mass % or more, and most preferably 40 mass % or more. If the water absorbing agent of the present invention in the water absorbent core have mass of less than 20 mass %, there is a risk that a sufficient absorption effect can not be obtained.

For obtaining the water absorbent core by using the water absorbing agent of the present invention and the cellulose fibers, for example, the following conventional methods may be adopted as appropriate: a method for obtaining the water absorbent core by dispersing the water absorbing agent on a paper sheet or mat made of the cellulose fibers, and if necessary, by sandwiching the water absorbing agent between the paper sheets or mats; a method for obtaining the water absorbent core by blending the cellulose fibers and the water absorbing agent uniformly; and the like methods. A more preferable method encompasses a method for obtaining the water absorbent core by dry-mixing the water absorbing agent and the cellulose fibers to obtain a mixture of them, and then compressing the mixture. This method significantly prevents fall-out of the water absorbing agent from the cellulose fibers. It is preferable that the compression be carried out while heating the mixture. The heating is carried out, for example, in a range of 50° C. to 200° C.

When using the water absorbing agent according to the present invention in the water absorbent core, it is possible to obtain the highly excellent water absorbent core that quickly absorbs liquid and leaves less residual liquid in a surface layer of the water absorbent core.

These excellent water absorbing properties allow the water absorbing agent of the present invention to be used as a water absorbing retaining agent for various usages, for example: a water absorbing retaining agent for sanitary material such as a disposable diaper, a sanitary napkin, an incontinence pad, a medical pad, and the like; a water retaining agent for agriculture/horticulture, such as a substitute for sphagnum moss, a soil conditioner, a water retaining agent, an agrichemical effect keeping agent, and the like; a water retaining agent for construction/civil engineering usages, such as a dew condensation preventing agent for an interior wall material, an additive for cement, and the like; a release controlling agent, a cold insulating agent, a disposable body warmer, a coagulant for polluted mod, a freshness preserving agent for a food, an ion exchanging column material, a dehydrating agent for sludge/oil, a desiccant agent, a humidity conditioning agent, and the like. Particularly, the water absorbing agent of the present invention is suitable for use in a sanitary material (such as a disposable diaper, a sanitary napkin, and the like) for absorbing excrement, urine, and/or blood.

In a case where the water absorbent core according to the present invention is used in the sanitary material for the disposable diaper, the sanitary napkin, the incontinence pad, the medical pad, or the like, it is preferable that the water absorbent core is used in such an arrangement that includes (a) a liquid-permeable top sheet provided next to a body of a user, (b) a liquid-impermeable back sheet provided next to cloths of the user but far away from the body of the user, and (c) a water absorbent core provided between the top sheet and the back sheet. The water absorbent core may be multi-layered (two or more layers). Further, the water absorbent core may be used in combination with a pulp layer or the like.

EXAMPLES

Through the following Examples, the present invention is further described. However, the present invention is not limited to the following Examples. In the following examples, "part by mass" may be described, for convenience, as "part", and "litter" as "L". Further, "% by mass" may be described as "wt %".

Properties of a water absorbing resin, water absorbing resin particles, or a water absorbing agent were measured in the following measurement method. Without any special descriptions, the following measurement was conducted at room temperature (20 to 25° C.) and humidity of 50 RH %.

In a case of a water absorbing agent that has been used as a final product such as a sanitary material, the water absorbing agent absorbs moisture. In this case, the water absorbing agent may be appropriately separated from the final product and dried under low pressure and at low temperature (for example, dried under not more than 1 mmHg and at 60° C. for 12 hours), so that the resultant thus obtained may be measured. Further, each solid content of the water absorbing agents used in Examples and Comparative Examples was not less than 94 wt %. The following descriptions of measurement methods deal with measurements of the water absorbing agent as an example, but properties of water absorbing resin particles also can be measured in the same manner.

<Centrifuge Retention Capacity (CRC)>

The centrifuge retention capacity (CRC) represents an absorption capacity at which 0.90 wt % of saline is absorbed for 30 minutes without load. The CRC is also referred to as absorption capacity without load.

Then, 0.200 g of water absorbing agent was evenly contained in a bag (85 mm×60 mm) made of a nonwoven fabric (manufactured by Nangoku Pulp Kogyo Co., Ltd., Heatron Paper: model type is GSP-22) and was heat-sealed. Then, the bag was soaked in an excessively large amount (generally, about 500 ml) of 0.90 wt % saline (sodium chloride aqueous solution) at room temperature, and was withdrawn 30 minutes later. By use of a centrifugal separator (manufactured by KOKUSAN corporation, centrifugal machine: model type is H-122), the bag was drained for three minutes at centrifugal force (250 G) described in edana ABSORBENCY II 441.1-99, and a weight W1 (g) of the bag was measured. Further, the same operation was performed without using the water absorbing agent, and a weight W0 (g) was measured. Then, from the weights W1 and W0, the centrifuge retention capacity (CRC) (g/g) was calculated according to the following equation.

Centrifuge Retention Capacity (CFC) (g/g)=($W1$(g)−$W0$(g))/(weight (0.200 g) of water absorbing agent)−1

<Absorbency Against Pressure of 4.83 kPa (AAP)>

The absorbency against pressure (AAP) represents an absorption capacity at which 0.90 wt % of saline is absorbed for 60 minutes at 4.83 kPa. The AAP is also referred to as absorbency under a pressure of 4.83 kPa. FIG. 1 is a cross sectional view illustrating a measuring apparatus of AAP.

With the use of the measuring apparatus illustrated in FIG. 1, the absorbency against pressure (AAP) was measured. On a bottom of a plastic supporting cylinder 100 having a 60 mm internal diameter, a Stainless metal net 101 of 400 mesh (mesh size of 38 µm) was fusion-bonded. Then, under a condition of a room temperature (20° C. to 25° C.) and 50% RH humidity, 0.900 g of a water absorbing agent was evenly dispersed on the stainless metal net 101. Subsequently, a piston 103 and a load 104 were placed in this order on the water absorbing agent. External diameters of the piston 103 and the load 104 were slightly smaller than 60 mm which was the internal diameter of the supporting cylinder 100, so that there was no gap between the piston and the supporting cylinder, and upward and downward movements of the piston 103 and the load 104 would not be hampered. Note that, the piston 103 and the load 104 were so adjusted as to evenly apply a 4.83 kPa (0.7 psi) load onto the water absorbing agent as a test body 102. Then, a weight Wa (g) of the entire measuring apparatus 10 was measured.

Inside a petri dish 105 having a 150 mm diameter, a glass filter 106 (product of Sougo Rikagaku Glass Seisakusho Co., Ltd.; diameter of fine pores: 100 µm to 120 µm) having a 90 mm diameter was placed. Thereafter, 0.90 wt % saline 108 (at not less than 20° C. but not more than 25° C.) was added until it reached a level of an upper surface of the glass filter 106. Then, a piece of filter paper 107 (product of Advantec Toyo Kaisha, Ltd.; product name: JIS P3801, No. 2; thickness: 0.26 mm; diameter of retained particles: 5 µm) having a 90 mm diameter was placed thereon, so that an entire surface of the filter paper 107 was wetted. An excess of the 0.90 wt % saline 108 was removed.

A set of the measuring apparatus 10 was placed on the wet filter paper 107. Then, the water absorbing agent was made to absorb the solution for one hour under the load. One hour later, the set of the measuring apparatus 10 was lifted, and a weight Wb (g) thereof was measured. From the weights Wa and Wb, the absorbency against pressure of 4.83 kPa (AAP) (g/g) was calculated according to the following equation.

Absorbency against pressure of 4.83 kPa (AAP)=($Wb$(g)−$Wa$(g))/weight (0.900 g) of water absorbing agent)

<Saline Flow Conductivity (SFC)>

Figure 2:
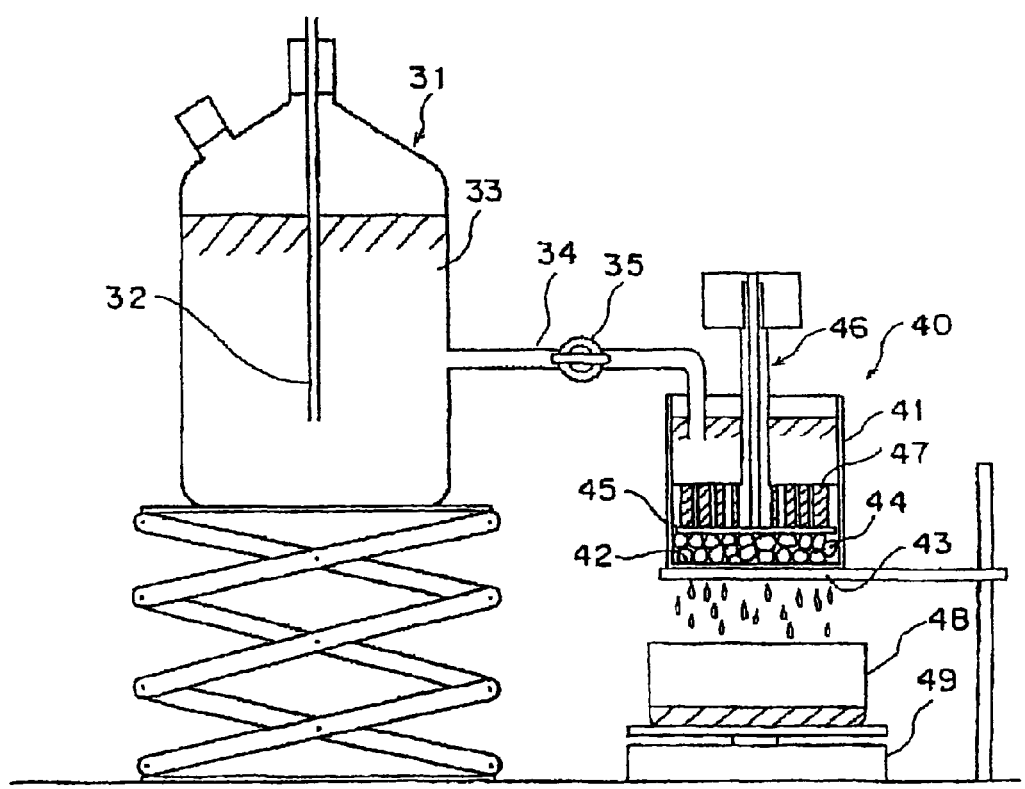
FIG. 2 is a schematic view illustrating a measuring apparatus for measuring SFC.

The saline flow conductivity (SFC) is a value indicative of liquid permeability in a case where the water absorbing agent is swollen. As the value of SFC is higher, the liquid permeability is higher. In Examples, a test was carried out on the basis of an SFC test described in U.S. Pat. No. 5,849,405. FIG. 2 is a view schematically illustrating a measuring apparatus of SFC.

In the measurement apparatus illustrated in FIG. 2, a glass tube 32 was inserted into a tank 31, and a lower end of the glass tube 32 was disposed so that 0.69 wt % saline 33 was positioned 5 cm higher than a bottom of the swelling gel 44 in a cell 41. Further, the 0.69 wt % saline 33 contained in the tank 31 was supplied to the cell 41 via an L-shaped tube 34 with a cock. A collecting vessel 48 for collecting liquid having passed through a gel layer was disposed under the cell 41, and the collecting vessel 48 was placed on a pan scale 49. An inside diameter of the cell 41 was 6 cm, and No. 400 stainless metal net (38 µm in mesh) 42 was placed on a bottom of a lower portion of the cell 41. A hole 47 which allowed liquid to pass through was provided on a lower portion of a piston 46, and a glass filter 45 having high permeability was provided on the bottom thereof so that the water absorbing agent or the swelling gel did not enter into the hole 47. The cell 41 was placed on a table for the cell, and the table's surface which is in contact with the cell 41 was positioned on the stainless metal net 43 which did not prevent the liquid from passing through.

An artificial urine (1) was prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of diammonium hydrogen phosphate, and 994.25 g of pure water.

By use of the measurement apparatus 20 illustrated in FIG. 2, the water absorbing agent (0.900 g) evenly contained in a vessel 40 was swollen in the artificial urine (1) under a pressure of 2.07 kPa (0.3 psi) for 60 minutes, so as to obtain the gel 44, and a height of a gel layer of the gel 44 was recorded. Then, the 0.69 wt % saline 33 was made to flow from the tank 31 and to pass through the swelling gel layer at a constant hydrostatic pressure under the pressure of 2.07 kPa (0.3 psi). The SFC test was carried out at room temperature (not less than 20° C. but not more than 25° C.). By using a computer and a scale, an amount of liquid passing through the gel layer at intervals of 20 seconds was recorded for 10 minutes as a time function. A flow rate Fs(T) of the solution passing through the swelling gel 44 (mainly between particles thereof) was determined in terms of g/s by dividing an increasing weight (g) by an increasing time (s). A time in which a constant hydrostatic pressure and a stable flow rate had been obtained was set as "Ts", and only data obtained between "Ts" and a ten-minute interval was used to calculate the flow rate, the flow rate calculated between "Ts" and a ten-minute interval was used to calculate a value of Fs (T=0), i.e., a first flow rate of the solution passing through the gel layer. Fs (T=0) was calculated by extrapolating T=0 from a result obtained by performing least mean square approximation of a relationship between Fs (T) and Time.

$$\text{Saline flow conductivity } (SFC) = (Fs\ (T=0) \times L0)/(\rho \times A \times \Delta P)$$

$$= (Fs\ (T=0) \times L0)/139506$$

Here,

Fs (T=0): a flow rate represented by "g/s"
L0: a height of the gel layer that is represented by "cm"
ρ: a density (1.003 g/cm$^3$) of NaCl solution A: an area (28.27 cm$^2$) on the upper side of the gel layer of the cell 41

ΔP: a hydrostatic pressure (4920 dyne/cm$^2$) exerted to the gel layer. Further, a unit of SFC value is (cm$^3$·s·10$^{-7}$·g$^{-1}$).

In a case where the hydrostatic pressure does not satisfy the above because the liquid passes through too fast, it is also possible to calculate SFC by changing the value ΔP to a value calculated from a height of the liquid level the saline.

<Vortex Water-Absorption Time>

As a Vortex water-absorption time, a vortex water-absorption time into a physiological saline was measured as follows: 0.02 parts of Food Blue No. 1 Brilliant Blue=FCF (food additive) was added to 1000 parts by mass of a previously prepared physiological saline (0.9% saline); the temperature of the resultant physiological saline was adjusted to 30° C.; 50 ml of thus obtained physiological saline, to which the Food Blue No. 1 Brilliant Blue was added, was weighed and put into a 100 ml beaker; 2.0 g of the water absorbing agent (or the water absorbing resin) was put into the saline while the saline was stirred with a stirrer chip (length: 40 mm, diameter: 8 mm); and the Vortex water-absorption time (seconds) was measured. An end-point was determined in conformity with a standard described in JIS K 7224 (1996) "Testing method for water absorption rate of super absorbent polymers—Descriptions". The Vortex water-absorption time (seconds) was determined as a time interval between the time when the water absorbing agent (or the water absorbing resin) was put into the saline and the time when the stirrer chip was covered by a test solution that is the water absorbing agent (or the water absorbing resin) that had absorbed the saline.

<FSR (Free Swell Rate)>

An FSR is an index of speed, at which a fluid of a water absorbing agent is absorbed. A higher value of the absorption speed is preferable. Use of the water absorbing agent having a high value of FSR makes it possible to obtain a water absorbent core, which is excellent in the absorption speed of the fluid. The absorption speed is measured in a way described below.

1.000±0.0005 g of the water absorbing agent was accurately weighed to four places of decimals (Wc (unit: g)), and put into a 25 ml glass beaker (diameter: 32-34 mm, height: 50 mm). In this process, the water absorbing agent was put into the beaker in such a manner that a top surface of the water absorbing agent in the beaker was leveled. If necessary, the beaker may be gently tapped so that the water absorbing agent is leveled. Next, 20 ml of 0.9 mass % sodium chloride aqueous solution having its temperature adjusted to 23° C.±2.0° C. was weighed and put into a 50 ml glass beaker, and weight of the 0.9 mass % sodium chloride aqueous solution was measured to four places of decimals (Wd (unit: g)). Next, the measured 0.9 mass % sodium chloride aqueous solution was quickly poured into the 25 ml beaker, which contains the water absorbing agent therein. At a time when the poured sodium chloride aqueous solution and the water absorbing agent came into contact with each other, time measurement was started. During the measurement, the top surface of the sodium chloride aqueous solution inside the beaker was observed visually by watching the top surface at an angle of approximately 20°. Then, at a time when the top surface of the sodium chloride aqueous solution was replaced with the top surface of the water absorbing agent that had absorbed the sodium chloride aqueous solution (which resulted because the water absorbing agent absorbed the sodium chloride aqueous solution), the time measurement was stopped (Th (unit: second)). Next, weight of the remaining sodium chloride aqueous solution, which was attached to the beaker after the sodium chloride aqueous solution was poured, was measured to four places of decimals (We (unit: g)). Weight of the sodium chloride aqueous solution (Wf (unit: g)) having been poured was calculated by using the following formula (a). Further, the FSR (unit: g/g/sec) was calculated by using the following formula (b).

$$Wf(g)=Wd(g)-We(g) \quad \text{Formula (a)}$$

$$FSR(g/g/sec)=Wf/(Th \times Wc) \quad \text{Formula (b)}$$

The same measurement was carried out three times per sample, and an average of the measurements was calculated as a measured result.

<Mass Median Particle Size (D50) and Logarithmic Standard Deviation (σζ) of Particle Size Distribution>

Tests were carried out on the basis of mass median particle size (D50) test and logarithmic standard deviation (σζ) test described in International Publication No. 2004/69915 pamphlet.

<Ratio of Particles Having Particle Size that Allows the Particles to Pass Through Sieve with 150 μm in Mesh>

Classification was carried out in the same manner as the mass median particle size (D50) and the logarithmic standard deviation (σζ) of the particle size distribution, so that a ratio of particles (wt %) having a particle size that allowed the particles to pass through a sieve with 150 μm in mesh was calculated from an amount of particles that had passed through the sieve with 150 μm in mesh.

<Solid Content of Water Absorbing Agent>

Solid content of the water absorbing agent indicates a ratio of components involatile at 180° C. in the water absorbing agent. Further, its relation with moisture content is as follows.

Solid content (wt %)=100−moisture content (wt %)

The solid content was measured in the following manner.

About 1 g of a water absorbing agent (weight Ws (unit: g)) was measured and poured into an aluminum cup (weight W1 (unit: g)) having a bottom surface of about 5 cm in diameter, and left to stand for 3 hours in a calm dryer at 180° C. so that the water absorbing agent was dried. Thereafter, a sum of weight (Wk (unit: g)) of the aluminum cup and the water absorbing agent thus dried was measured, and the solid content was calculated according to the following equation.

Solid content (wt %)=((Wk−W1)/Ws)×100

<Amount of Water-Soluble Content (Water-Soluble Component)>

Into a 250 ml plastic container having a cover, 184.3 g of 0.90 wt % saline was measured and poured. Into the solution, 1.00 g of the water absorbing agent was added, and the plastic container with the solution and the water absorbing agent was stirred for 16 hours by rotating a magnetic stirrer (diameter: 8 mm, length: 25 mm) at 500 rpm, thereby extracting an extractable content from the resin. The extract solution was filtered through a piece of filter paper (product of Advantec Toyo Kaisha, Ltd.; product name: JIS P3801, No. 2; thickness: 0.26 mm; diameter of retained particles: 5 μm), thereby obtaining a filtrate. Then, 50.0 g of the filtrate was measured so as to be used as a measurement solution.

First, only the 0.90 wt % saline was titrated by using a 0.1N NaOH solution, until pH of the saline reached 10. Thereafter, the saline was titrated by using a 0.1N HCl solution, until pH of the saline reached 2.7. In this way, blank titration amounts ([bNaOH]ml and [bHCl]ml) were measured.

The same operation was performed with respect to the measurement solution, thereby measuring titration amounts ([NaOH]ml and [HCl]ml).

Thereafter, for example, in a case of a water absorbing agent including a known amount of acrylic acid and its sodium salt as its main component, an amount of a water-soluble content in the water absorbing agent was calculated, in accordance with the following equation, from an average molecular weight of the monomer and the titration amounts obtained by the foregoing operation. In a case of a water absorbing agent including an unknown amount of acrylic acid and its sodium salt, an average molecular weight of the monomer was calculated by using a neutralization ratio calculated by titration.

Water-soluble content (wt %)=0.1×(average molecular weight)×184.3×100×([HCl]−[$b$HCl])/1000/1.0/50.0

Neutralization ratio (mol %)=(1−([NaOH]−[$b$NaOH])/([HCl]−[$b$HCl]))×100

<Fixed Height Absorption (FHA)>

The fixed height absorption (FHA) was measured according to a method disclosed in US2005/000319A1. In the present invention, the measurement was carried out at height of 20 cm.

<Paint Shaker Test>

The paint shaker test (PS) was as follows. Firstly, 10 g of glass beads with 6 mm in diameter and 30 g of water absorbing resin or water absorbing agent were provided in a glass container with 6 cm in diameter and 11 cm in height, and the glass container was placed in a paint shaker (product of Toyo Seiki Seisaku-sho, Ltd., Product No. 488) and shaken at 800 cycle/min (CPM). Details of the apparatus are disclosed in Japanese Unexamined Patent Application Publication, Tokukaihei, No. 9-235378. A time for shaking in the test stated as "Paint shaker test 1" was 30 minutes, whereas that in the test stated as "Paint shaker test 2" was 10 minutes.

After shaking, the glass beads were removed by use of a JIS standard sieve with 2 mm in mesh. In this way, the water absorbing resin particles or the water absorbing agent thus damaged were/was obtained.

<Coloring Evaluation with Respect to Water Absorbing Agent (Hunter's Lab Color System/L Value, a Value, b Value, YI Value)>

The coloring of the water absorbing agent was evaluated by using a spectral colorimeter SZ-Σ80 COLOR MEASURING SYSTEM (product of NIPPON DENSHOKU). A reflection measurement was selected as a preset condition of measurement, and an accessory powder-paste sample table having internal diameter of 30 mm and height of 12 mm was used. Further, a powder-paste standard rounded white plate No. 2, and 30Φ floodlight pipe were used as a standard. About 5 g of water absorbing agent was provided in the built-in sample table (corresponding to about 60% of the built-in sample table). Then, an L value (Lightness: lightness index), an a value (chromaticity), and a b value (chromaticity) in Hunter's Lab color system were measured by the spectral colorimeter at room temperature (from 20 to 25° C.) and humidity of 50 RH %. These values indicate "L value, a value, and b value before exposure".

Subsequently, about 5 g of the water absorbing agent was placed in the paste sample table, and the paste sample table containing the water absorbing agent was exposed for 7 days in a constant-temperature-and-moisture apparatus (product of TABAI ESPEC CORPORATION, PLATINOUS LUCIFFER, PL-2G) in which temperature had been adjusted to 70±1° C. and relative humidity had been adjusted to 65±1%. The exposure was a test for promoting coloring for 7 day. After the exposure, an L value (Lightness), an a value (chromaticity), and a b value (chromaticity) in Hunter's Lab color system were measured by the spectral colorimeter. The values thus measured indicate "L value, a value, and b value after 7-day exposure in atmosphere at 70±1° C. and 65±1% of relative humidity". The higher the L value, the more preferable it would be. Further, it is preferable that absolute value of the a and b values be closer to zero.

Further, other object color YI (Yellowness Index) or WB (White Blue) can be measured at the same time by using the same device and the same measuring method. As the WB is larger, or YI is smaller, the water absorbing agent is less colored and its color is closer to substantial whiteness.

<Synthesis Example of Polymer (B)>

Synthesis examples of polymer (B) used in the water absorbing agent according to the present invention, the polymer (B) containing an ammonia (b1), an amine (b2), and an epihalohydrin (b3) as essential components, are described as follows.

Synthesis Example 1

90.2 g of dimethylamine aqueous solution (50%), 6.8 g of ammonia water (25%), and 172.6 g of water were put into a reactor that is equipped with a stirring device, a reflux condenser, a dropping funnel, and a thermometer. The mixture was stirred so as to be evenly dissolved, and thereafter 101.8 g of epichlorohydrin was dropped to the mixture through the dropping funnel over approximately 3 hours. After the dropping, the resultant product was reacted at 80° C. for 6 hours, thereby obtaining a colorless-light yellow aqueous solution that had a resin content of 39%. A weight-average molecular weight of the resultant polymer, which was measured with use of GPC (Gel Permeation Chromatography), was 20,000.

Synthesis Example 2

90.2 g of dimethylamine aqueous solution (50%), 34.0 g of ammonia water (25%), and 217.9 g of water were put into a reactor that is equipped with a stirring device, a reflux condenser, a dropping funnel, and a thermometer. The mixture was stirred so as to be evenly dissolved, and thereafter 138.8 g of epichlorohydrin was dropped to the mixture through the dropping funnel over approximately 3 hours. After the dropping, the resultant product was reacted at 80° C. for 8 hours, thereby obtaining a colorless-light yellow aqueous solution that had a resin content of 39%. A weight-average molecular weight of the resultant polymer, which was measured with use of GPC, was 25,000.

Synthesis Example 3

90.2 g of dimethylamine aqueous solution (50%), 68 g of ammonia water (25%), and 2746 g of water were put into a reactor that is equipped with a stirring device, a reflux condenser, a dropping funnel, and a thermometer. The mixture was stirred so as to be evenly dissolved, and thereafter 185 g of epichlorohydrin was dropped to the mixture through the dropping funnel over approximately 3 hours. After the dropping, the resultant product was reacted at 80° C. for 10 hours, thereby obtaining a colorless-light yellow aqueous solution that had a resin content of 39%. A weight-average molecular weight of the resultant polymer, which was measured with use of GPC, was 30,000.

Synthesis Example 4

90.2 g of dimethylamine aqueous solution (50%), 68 g of ammonia water (25%), and 81 g of water were put into a reactor that is equipped with a stirring device, a reflux condenser, a dropping funnel, and a thermometer. The mixture was stirred so as to be evenly dissolved, and thereafter 203.5 g of epichlorohydrin was dropped to the mixture through the dropping funnel over approximately 3 hours. After the dropping, the resultant product was reacted at 90° C. for 10 hours, thereby obtaining a colorless-light yellow aqueous solution that had a resin content of 57%. A weight-average molecular weight of the resultant polymer, which was measured with use of GPC, was 80,000.

Synthesis Example 5

146.2 g of diethylamine aqueous solution (50%), 34.0 g of ammonia water (25%), and 231.9 g of water were put into a reactor that is equipped with a stirring device, a reflux condenser, a dropping funnel, and a thermometer. The mixture was stirred so as to be evenly dissolved, and thereafter 138.8 g of epichlorohydrin was dropped to the mixture through the dropping funnel over approximately 3 hours. After the dropping, the resultant product was reacted at 80° C. for 10 hours, thereby obtaining a colorless-light yellow aqueous solution that had a resin content of 39%. A weight-average molecular weight of the resultant polymer, which was measured with use of GPC, was 30,000.

Synthesis Example 6

120.5 parts of water, 30.4 parts (0.5 mol) of 28% ammonia water, 45 parts (0.5 mol) of 50% dimethylamine, and 18.3 parts (0.25 mol) of n-butylamine were put into a reactor that is equipped with a stirring device, a reflux condenser, a dropping funnel, and a thermometer. Then, 115.6 parts (1.25 mol) of epichlorohydrin was dropped to the mixture at a temperature of less than 40° C. over 90 minutes. After that, the temperature of the mixture was raised to 40° C., and was maintained at 40° C. for 1 hour. After that, the temperature of the mixture was raised to 80° C. and was maintained at 80° C. for 1.5 hours. Thereafter, the mixture was cooled down to room temperature. The obtained reaction product had a solid content of 52.6%, viscosity of 23.0 cps, and pH of 5.5.

Producing the Water Absorbing Agent of the Present Invention

Example 1

In a reactor formed by attaching a cover to a double-arm type stainless kneader having a capacity of 10 liters and equipped with two sigma type blades and a jacket, a reaction liquid was obtained by dissolving 436.4 g of acrylic acid, 4617.9 g of 37 mass % sodium acrylate aqueous solution, 395.96 g of pure water, 10.13 g (0.08 mol %) of polyethylene glycol diacrylate (molecular weight is 523; in regard to the polyethylene glycol diacrylate, which is used as an internal cross-linking agent, the average number (n) of moles of added ethylene oxide is 9), and 0.873 g (0.04 mol %) of 1,4-butanediol. Next, the reaction liquid was degassed for 20 minutes under an atmosphere of nitrogen gas while being maintained at 25° C. Oxygen dissolved in the system was 1 ppm or less. Next, 14.53 g of 20 mass % sodium persulfate aqueous solution and 24.22 g of 1 mass % L-ascorbic acid aqueous solution were added to the reaction liquid while being stirred. The reaction solution reached 25.5° C. after approximately 34 seconds, and then polymerization started. Added to the system 3 minutes after the beginning of the polimerization was 21.55 g (200 wtppm of total monomer mass) of 2 mass % ethylene diamine tetra(methylene phosphonic acid) pentasodium salt (abbreviation: EDTMP.5Na) aqueous solution. Then, the polymerization was carried out at a temperature in a range of not less than 25.5° C. and not more than 92° C. while the resultant gel was crushed. A hydrogel cross-linked polymer was taken out 30 minutes after the beginning of the polymerization. The obtained hydrogel cross-linked polymer was crushed so that particles of substantial gel are approximately 5 mm or less in diameter.

The crushed hydrogel cross-linked polymer was spread on a metal net of 50 mesh, and then hot-air dried at 180° C. for 45 minutes. The dried hydrogel was pulverized with a roller mill, and then classified with a JIS standard sieve having a mesh size of 710 μm. Particles passing through the JIS standard sieve were further classified with a JIS standard sieve having a mesh size of 172 μm. Fine particles passing through the JIS standard sieve having a mesh size of 172 μm were excluded, thereby obtaining an irregularly-pulverized water absorbent resin (a) having a mass median particle size (D50) of 389 μm and 0.31 logarithmic standard deviation (σζ) of the particle-size distribution. The water absorbent resin (a) had a centrifugal retention capacity (CRC) of 32.9 (g/g), and included 9.7 mass % of water-soluble contents and 0.3 mass % of particles having a size with which the particles can pass through a sieve having a mesh size of 150 μm.

A surface cross-linking liquid composed of a liquid prepared by mixing 0.34 parts of 1,4-butanediol, 0.56 parts of propylene glycol, and 3.0 parts of pure water was evenly mixed with 100 parts of the water absorbing resin (a) as obtained. The resultant mixture was heated at 208° C. for 40 minutes. Then, obtained particles were pulverized so as to pass through a JIS standard sieve having a mesh size of 710 μm. Water absorbent resin particles (1) each having a cross-linked surface were thus obtained.

Next, a paint shaker test 1 was performed on the water absorbing resin particles (1). Water absorbing resin particles (1D) were thus obtained from the water absorbing resin particles (1). The mass median particle size (D50) of the water absorbing resin particles (1D) was 389 μm, the logarithmic standard deviation (σζ) of the particle size distribution was 0.31, water-soluble content was 9.2 mass %, and an amount of particles having a size which can pass through a sieve with openings of 150 μm was 0.4 mass %

Shown in Table 1 were properties of the water absorbing resin (a). Shown in Table 2 were properties of the water absorbing resin particles (1D).

A mixed solution prepared by mixing 2.0 parts by mass of UNISENCE KHE 102L (by SENKA corporation, dimethylamine/ammonia/epichlorohydrin resin, average molecular weight is approximately 70,000 (reference value), an aqueous solution having a concentration of solid content of 50 mass %, which aqueous solution has a pH of approximately 6 when it is diluted to 1%) and 2.0 parts by mass of methanol were added to 100 parts by mass of the water absorbing resin particles (1D). In this process, the mixed solution was added while the water absorbing resin particles (1D) were being stirred, so that the solution was evenly added to the particles. The mixture was left at rest and dried at 90° C. for 1 hour without air blowing. Thereafter, the obtained mixture was passed through a JIS standard sieve having a mesh size of 710 μm. A water absorbing agent (1) was thus obtained. The mass median particle size (D50) of the water absorbing agent (1) was 395 μm, the logarithmic standard deviation (σζ) of the particle size distribution was 0.30, water-soluble content was 9.0 mass %, and an amount of particles having a size which can pass through a sieve with openings of 150 μm was 0 mass %.

Note that a dimethylamine/ammonia/epichlorohydrin resin is a polymer containing a structure represented by the following chemical formula (1) and a structure represented by the following chemical formula (2):

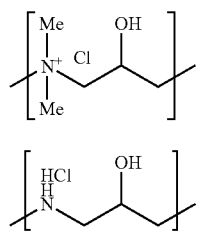

(1)

(2)

Example 2

A water absorbing agent (2) was prepared in the same manner as in Example 1 except that a mixed solution prepared by mixing 1.0 parts by mass of UNISENCE KHE 102L and 1.0 parts by mass of methanol was used instead of the mixed solution prepared by mixing 2.0 parts by mass of UNISENCE KHE 102L and 2.0 parts by mass of methanol.

Example 3

A water absorbing agent (3) was prepared in the same manner as in Example 1 except that a mixed solution prepared by mixing 0.5 parts by mass of UNISENCE KHE 102L and 0.5 parts by mass of methanol was used instead of the mixed solution prepared by mixing 2.0 parts by mass of UNISENCE KHE 102L and 2.0 parts by mass of methanol.

Example 4

A water absorbing agent (4) was prepared in the same manner as in Example 1 except that a mixed solution prepared by mixing 0.2 parts by mass of UNISENCE KHE 102L and 0.2 parts by mass of methanol was used instead of the mixed solution prepared by mixing 2.0 parts by mass of UNISENCE KHE 102L and 2.0 parts by mass of methanol.

Example 5

A water absorbing agent (5) was prepared in the same manner as in Example 1 except that 2.0 parts by mass of UNISENCE KHE 102L was used instead of the mixed solution prepared by mixing 2.0 parts by mass of UNISENCE KHE 102L and 2.0 parts by mass of methanol.

Example 6

A water absorbing agent (6) was prepared in the same manner as in Example 1 except that 1.0 parts by mass of UNISENCE KHE 102L was used instead of the mixed solution prepared by mixing 2.0 parts by mass of UNISENCE KHE 102L and 2.0 parts by mass of methanol.

Example 7

A water absorbing agent (7) was prepared in the same manner as in Example 1 except that 0.5 parts by mass of UNISENCE KHE 102L was used instead of the mixed solution prepared by mixing 2.0 parts by mass of UNISENCE KHE 102L and 2.0 parts by mass of methanol.

Example 8

A water absorbing agent (8) was prepared in the same manner as in Example 1 except that 0.2 parts by mass of UNISENCE KHE 102L was used instead of the mixed solution prepared by mixing 2.0 parts by mass of UNISENCE KHE 102L and 2.0 parts by mass of methanol.

Example 9

A water absorbing agent (9) was prepared in the same manner as in Example 1 except that a mixed solution prepared by mixing 2.0 parts by mass of UNISENCE KHE 1000L (by SENKA corporation, dimethylamine/ammonia/epichlorohydrin resin, average molecular weight is approximately 300,000 (reference value), viscosity is 1500 (mPa·s), an aqueous solution having a concentration of solid content of 50 mass %) and 2.0 parts by mass of methanol was used instead of the mixed solution prepared by mixing 2.0 parts by mass of UNISENCE KHE 102L and 2.0 parts by mass of methanol.

Example 10

A water absorbing agent (10) was prepared in the same manner as in Example 1 except that a mixed solution prepared by mixing 2.0 parts by mass of dimethylamine/epichlorohydrin resin aqueous solution (molar ratio; dimethylamine/epichlorohydrin=1/1, average molecular weight is 52,000, viscosity is 258 (mPa·s), the aqueous solution having a concentration of solid content of 50 mass %) and 2.0 parts by mass of methanol was used instead of the mixed solution prepared by mixing 2.0 parts by mass of UNISENCE KHE 102L and 2.0 parts by mass of methanol.

Example 11

A water absorbing agent (11) was prepared in the same manner as in Example 1 except that a mixed solution prepared by mixing 2.0 parts by mass of dimethylamine/ammonia/epichlorohydrin resin aqueous solution (molar ratio; dimethylamine/ammonia/epichlorohydrin=0.9/0.1/1.0, average molecular weight is 88,000, viscosity is 179 (mPa·s), the aqueous solution having a concentration of solid content of 50 mass %) and 2.0 parts by mass of methanol was used instead of the mixed solution prepared by mixing 2.0 parts by mass of UNISENCE KHE 102L and 2.0 parts by mass of methanol.

Example 12

A water absorbing agent (12) was prepared in the same manner as in Example 1 except that a mixed solution prepared by mixing 2.0 parts by mass of dimethylamine/ammonia/epichlorohydrin resin aqueous solution (molar ratio; dimethylamine/ammonia/epichlorohydrin=0.8/0.2/1.0, average molecular weight is 69,000, viscosity is 158 (mPa·s), the aqueous solution having a concentration of solid content of 50 mass %) and 2.0 parts by mass of methanol was used instead of the mixed solution prepared by mixing 2.0 parts by mass of UNISENCE KHE 102L and 2.0 parts by mass of methanol.

Example 13

A water absorbing agent (13) was prepared in the same manner as in Example 1 except that a mixed solution prepared by mixing 2.0 parts by mass of dimethylamine/ammonia/epichlorohydrin resin aqueous solution (molar ratio; dimethylamine/ammonia/epichlorohydrin=0.9/0.1/1.0, average molecular weight is 190,000, viscosity is 1584 (mPa·s), the aqueous solution having a concentration of solid content of 50 mass %) and 2.0 parts by mass of methanol was used instead of the mixed solution prepared by mixing 2.0 parts by mass of UNISENCE KHE 102L and 2.0 parts by mass of methanol.

Example 14

A water absorbing agent (14) was prepared in the same manner as in Example 1 except that a mixed solution prepared by mixing 2.0 parts by mass of dimethylamine/ammonia/epichlorohydrin resin aqueous solution (molar ratio; dimethylamine/ammonia/epichlorohydrin=0.8/0.2/1.0, average molecular weight is 140,000, viscosity is 1380 (mPa·s), the aqueous solution having a concentration of solid content of 50 mass %) and 2.0 parts by mass of methanol was used instead of the mixed solution prepared by mixing 2.0 parts by mass of UNISENCE KHE 102L and 2.0 parts by mass of methanol.

Example 15

2.0 parts by mass of UNISENCE KHE 102L was added to 100 parts by mass of the water absorbing resin particles (1D) obtained in Example 1. Three minutes later, a mixed solution prepared by mixing 1.17 parts by mass of 27.5 mass % aluminum sulfate aqueous solution (equivalent to 8 mass % of aluminum sulfate), 0.196 parts by mass of 60 mass % sodium lactate aqueous solution, and 0.029 parts by mass of propylene glycol was further added. In this process, the solutions were added while the water absorbing resin particles (1D) were being stirred, so that the solutions were evenly added to the particles. The mixture was left at rest and dried at 90° C. for 1 hour without air blowing. Thereafter, the obtained mixture was passed through a JIS standard sieve having a mesh size of 710 μm. A water absorbing agent (15) was thus obtained.

Example 16

A mixed solution prepared by mixing 1.17 parts by mass of 27.5 mass % aluminum sulfate aqueous solution (equivalent to 8 mass % of aluminum sulfate), 0.196 parts by mass of 60 mass % sodium lactate aqueous solution, and 0.029 parts by mass of propylene glycol was added to 100 parts by mass of the water absorbing resin particles (1D) obtained in Example 1. Three minutes later, 2.0 parts by mass of UNISENCE KHE 102L was further added. In this process, the solutions were added while the water absorbing resin particles (1D) were being stirred, so that the solutions were evenly added to the particles. The mixture was left at rest and dried at 90° C. for 1 hour without air blowing. Thereafter, the obtained mixture was passed through a JIS standard sieve having a mesh size of 710 μm. A water absorbing agent (16) was thus obtained.

Example 17

A mixed solution prepared by mixing 1.17 parts by mass of 27.5 mass % aluminum sulfate aqueous solution (equivalent to 8 mass % of aluminum sulfate), 0.196 parts by mass of 60 mass % sodium lactate aqueous solution, 0.029 parts by mass of propylene glycol, and 2.0 parts by mass of UNISENCE KHE 102L was added to 100 parts by mass of the water absorbing resin particles (1D) obtained in Example 1. In this process, the solution was added while the water absorbing resin particles (1D) were being stirred, so that the solution was evenly added to the particles. The mixture was left at rest and dried at 90° C. for 1 hour without air blowing. Thereafter, the obtained mixture was passed through a JIS standard sieve having a mesh size of 710 μm. A water absorbing agent (17) was thus obtained.

Comparative Example 1

Water absorbent resin particles (1D) were provided as a comparative water absorbing agent (1).

Comparative Example 2

A comparative water absorbing agent (2) was prepared in the same manner as in Example 1 except that a mixed solution prepared by mixing 1.17 parts by mass of 27.5 mass % aluminum sulfate aqueous solution (equivalent to 8 mass % of aluminum sulfate), 0.196 parts by mass of 60 mass % sodium lactate aqueous solution, and 0.029 parts by mass of propylene glycol was used instead of the mixed solution prepared by mixing 2.0 parts by mass of UNISENCE KHE 102L and 2.0 parts by mass of methanol.

Comparative Example 3

A comparative water absorbing agent (3) was prepared in the same manner as in Example 1 except that 2.0 parts by mass of polyethylenimine aqueous solution (average molecular weight is 70,000, NIPPON SHOKUBAI CO., LTD, product number EPOMIN P-1050, 50 mass % aqueous solution) was used instead of the mixed solution prepared by mixing 2.0 parts by mass of UNISENCE KHE 102L and 2.0 parts by mass of methanol.

Comparative Example 4

A comparative water absorbing agent (4) was prepared in the same manner as in Example 1 except that 3.0 parts by mass of polyvinylamine aqueous solution (by BASF, product number Luredur PR8097, 10.5 mass % aqueous solution) was used instead of the mixed solution prepared by mixing 2.0 parts by mass of UNISENCE KHE 102L and 2.0 parts by mass of methanol.

Comparative Example 5

A comparative water absorbing agent (5) was prepared in the same manner as in Example 1 except that 5.0 parts by mass of polyallylamine aqueous solution (Polyallylamine-H, Nitto Boseki Co., Ltd., 20% aqueous solution, molecular weight is 60,000 to 100,000) was used instead of the mixed solution prepared by mixing 2.0 parts by mass of UNISENCE KHE 102L and 2.0 parts by mass of methanol.

Comparative Example 6

In accordance with Reference Example 1 described in Japanese Examined Patent Application Publication, Tokukohei, No. 07-10893, 6.0 g of epichlorohydrin, 1.47 g of 25% ammonia water, and 60 g of methanol were mixed with each other while being stirred, and then the mixture was left at rest and reacted at 50° C. for 15 hours, so as to obtain a crosslinking liquid (A).

In accordance with Example 3 described in Japanese Examined Patent Application Publication, Tokukohei, No. 07-10893, 75 parts of 80% acrylic acid, 48.0 parts of 48.6% sodium hydroxide, and 48.6 parts of ion exchange water were mixed with each other, so as to prepare an acrylate aqueous solution whose neutralization degree was 70%. Then, 4.00 g of the above-obtained cross-linking liquid (A) was added to 1028 g of the acrylate aqueous solution. After the headspace of the mixture was replaced with nitrogen, 36 g of 2% peroxodisulfate aqueous solution, 21.6 g of 2% pyrosulfite aqueous solution, and 14.4 g of water diluted liquid of 40% glyoxal aqueous solution (50 times diluted) were added, thereby obtaining a mixed solution. Thereafter, the mixed solution was pored into a 48 cm×37 cm tray (inside is teflon-coated), and then the solution was polymerized inside a circulating hot air drier at 42° C. for 20 minutes, so as to obtain a hydrogel that was 48 centimeters long, 37 centimeters wide, and 0.5 to 0.6 centimeters thick. The obtained hydrogel was dried in a drum drier whose surface was 130° C., so as to obtain a flaky resin, and thereafter the flaky resin was pulverized with use of a pin mill. After that, the pulverized resin was classified, so as to obtain water absorbent resin powder whose particle size was 16 to 200 mesh. A comparative water absorbing agent (6) was thus obtained.

Shown in Table 3 were properties of the water absorbing agents (1) to (17) and comparative water absorbing agents (1) to (6). Shown in Table 4 were results of the coloring evaluation (Hunter's Lab color system/L value, a value, b value, and YI value) of the water absorbing agents (1) and (5), and comparative water absorbing agents (1) to (5).

TABLE 1

| | | CENTRIFUGAL RETENTION CAPACITY (CRC) g/g | WATER-SOLUBLE COMPONENT wt % | MASS-MEDIAN PARTICLE SIZE(D50) μm | LOG STANDARD DEVIATION OF PARTICLE-SIZE DISTRIBUTION (σζ) | RATIO OF PARTICLES PASSING THROUGH A SIEVE WITH 150 μm MESH SIZE wt % |
|---|---|---|---|---|---|---|
| EXAMPLE 1 | WATER ABSORBING RESIN (a) | 32.9 | 9.7 | 389 | 0.31 | 0.3 |

TABLE 2

| | | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g | FREE SWELL RATE (FSR) g/g/sec | WATER-ABSORPTION TIME (Vortex) sec |
|---|---|---|---|---|---|---|---|
| EXAMPLE 1 | WATER ABSORBING RESIN PARTICLES (1D) | 29.4 | 71 | 26.2 | 25.6 | 0.19 | 80 |

TABLE 3

| | | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g | FREE SWELL RATE (FSR) g/g/sec | WATER-ABSORPTION TIME (Vortex) sec |
|---|---|---|---|---|---|---|---|
| EX. 1 | WATER ABSORBING AGENT (1) | 29.1 | 169 | 23.0 | 21.7 | 0.24 | 60 |
| EX. 2 | WATER ABSORBING AGENT (2) | 29.0 | 120 | 23.9 | 22.5 | 0.27 | 54 |
| EX. 3 | WATER ABSORBING AGENT (3) | 29.1 | 105 | 24.8 | 23.1 | 0.27 | 48 |
| EX. 4 | WATER ABSORBING AGENT (4) | 29.1 | 102 | 26.1 | 24.2 | 0.24 | 63 |
| EX. 5 | WATER ABSORBING AGENT (5) | 29.1 | 129 | 23.2 | 21.1 | 0.25 | 60 |
| EX. 6 | WATER ABSORBING AGENT (6) | 29.3 | 123 | 23.4 | 22.3 | 0.26 | 53 |
| EX. 7 | WATER ABSORBING AGENT (7) | 29.5 | 109 | 24.4 | 22.8 | 0.25 | 57 |
| EX. 8 | WATER ABSORBING AGENT (8) | 29.2 | 106 | 25.7 | 24.1 | 0.25 | 54 |
| EX. 9 | WATER ABSORBING AGENT (9) | 29.1 | 125 | 23.1 | 22.3 | 0.24 | 62 |
| EX. 10 | WATER ABSORBING AGENT (10) | 29.0 | 124 | 23.7 | 22.5 | 0.24 | 62 |
| EX. 11 | WATER ABSORBING AGENT (11) | 29.1 | 146 | 23.6 | 22.5 | 0.24 | 63 |
| EX. 12 | WATER ABSORBING AGENT (12) | 29.1 | 116 | 23.1 | 22.2 | 0.24 | 64 |
| EX. 13 | WATER ABSORBING AGENT (13) | 29.0 | 115 | 23.0 | 22.1 | 0.24 | 64 |
| EX. 14 | WATER ABSORBING AGENT (14) | 29.1 | 124 | 23.0 | 22.1 | 0.24 | 64 |

TABLE 3-continued

|  |  | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g | FREE SWELL RATE (FSR) g/g/sec | WATER-ABSORPTION TIME (Vortex) sec |
|---|---|---|---|---|---|---|---|
| EX. 15 | WATER ABSORBING AGENT (15) | 29.0 | 123 | 23.4 | 22.4 | 0.25 | 54 |
| EX. 16 | WATER ABSORBING AGENT (16) | 29.0 | 143 | 23.4 | 22.5 | 0.26 | 52 |
| EX. 17 | WATER ABSORBING AGENT (17) | 29.0 | 122 | 23.1 | 22.3 | 0.25 | 54 |
| COM. EX. 1 | COMPARATIVE WATER ABSORBING AGENT (1) | 29.4 | 71 | 26.2 | 25.6 | 0.19 | 80 |
| COM. EX. 2 | COMPARATIVE WATER ABSORBING AGENT (2) | 28.9 | 90 | 24.1 | 22.9 | 0.20 | 76 |
| COM. EX. 3 | COMPARATIVE WATER ABSORBING AGENT (3) | 29.1 | 95 | 22.9 | 20.9 | 0.24 | 62 |
| COM. EX. 4 | COMPARATIVE WATER ABSORBING AGENT (4) | 29.3 | 95 | 22.8 | 20.8 | 0.24 | 62 |
| COM. EX. 5 | COMPARATIVE WATER ABSORBING AGENT (5) | 28.7 | 80 | 20.5 | 19.1 | 0.24 | 63 |
| COM. EX. 6 | COMPARATIVE WATER ABSORBING AGENT (6) | 29.1 | 0 | 8.2 | 7.8 | 0.19 | 82 |

Abbreviation:
EX. stands for EXAMPLE
COM. EX. stands for COMPARATIVE EXAMPLE

TABLE 4

| EXAMPLE | WATER ABSORBING AGENT | L-VALUE, a-VALUE, b-VALUE, AND YI (Yelowness Index) BEFORE BEING EXPOSED | | | |
|---|---|---|---|---|---|
|  |  | L-VALUE | a-VALUE | b-VALUE | YI-VALUE |
| EXAMPLE 1 | WATER ABSORBING AGENT (1) | 88.3 | −0.2 | 6.4 | 13.1 |
| EXAMPLE 5 | WATER ABSORBING AGENT (5) | 88.4 | −0.2 | 6.4 | 13.1 |
| COMPARATIVE EXAMPLE 1 | COMPARATIVE WATER ABSORBING AGENT (1) | 89.4 | −0.1 | 6.5 | 13.3 |
| COMPARATIVE EXAMPLE 2 | COMPARATIVE WATER ABSORBING AGENT (2) | 88.9 | −0.1 | 6.3 | 12.9 |
| COMPARATIVE EXAMPLE 3 | COMPARATIVE WATER ABSORBING AGENT (3) | 89.4 | −0.5 | 7.0 | 13.9 |
| COMPARATIVE EXAMPLE 4 | COMPARATIVE WATER ABSORBING AGENT (4) | 89.1 | −0.5 | 7.2 | 14.4 |
| COMPARATIVE EXAMPLE 5 | COMPARATIVE WATER ABSORBING AGENT (5) | 89.1 | −0.5 | 7.2 | 14.4 |

| EXAMPLE | WATER ABSORBING AGENT | L-VALUE, a-VALUE, b-VALUE, AND YI (Yelowness Index) 7 DAYS AFTER BEING EXPOSED TO ATMOSPHERE WITH TEMPERATURE OF 70 ± 1° C. AND RELATIVE HUMIDITY OF 65 ± 1% | | | |
|---|---|---|---|---|---|
|  |  | L-VALUE | a-VALUE | b-VALUE | YI-VALUE |
| EXAMPLE 1 | WATER ABSORBING AGENT (1) | 80.9 | 1.1 | 8.1 | 19.2 |
| EXAMPLE 5 | WATER ABSORBING AGENT (5) | 81.1 | 1.1 | 7.9 | 18.7 |
| COMPARATIVE EXAMPLE 1 | COMPARATIVE WATER ABSORBING AGENT (1) | 80.0 | 1.3 | 7.7 | 18.7 |
| COMPARATIVE EXAMPLE 2 | COMPARATIVE WATER ABSORBING AGENT (2) | 67.7 | 5.5 | 12.0 | 37.9 |

TABLE 4-continued

| | | | | | |
|---|---|---|---|---|---|
| COMPARATIVE EXAMPLE 3 | COMPARATIVE WATER ABSORBING AGENT (3) | 79.7 | 0.1 | 15.4 | 35.0 |
| COMPARATIVE EXAMPLE 4 | COMPARATIVE WATER ABSORBING AGENT (4) | 76.9 | 0.1 | 14.7 | 34.6 |
| COMPARATIVE EXAMPLE 5 | COMPARATIVE WATER ABSORBING AGENT (5) | 76.9 | 0.1 | 16.8 | 39.5 |

Table 3 clearly shows that the water absorbing agents (1) to (17) exhibit an excellent SFC value compared to the comparative water absorbing agents (1) to (6), both of which have substantially equal level of CRC. This proves that it is possible to obtain a water absorbent core having excellent fluid absorbing property in the case where the water absorbing agent according to the present invention is used in the water absorbent core of sanitary materials such as disposable diapers.

Also as compared to the water absorbing agents using conventional cationic macromolecular additives, i.e., Comparative Examples 3 to 5, the water absorbing agent according to the present invention exhibited excellent SFC value, AAP value, and FHA value. This indicates that in the present invention, it is possible to obtain a water absorbent core having excellent fluid absorbing property and excellent dryness (dry feeling) on its surface, compared to the case where a water absorbing agent using the conventional cationic macromolecular additives is used in the water absorbent core of sanitary materials such as disposable diapers.

The water absorbing agents (1) to (17) exhibited an excellent absorption speed (FSR, Vortex water-absorption time), compared to Comparative Example (1) in which no additive was used and to Comparative Example (2) in which only the polyvalent metal salt additive (aluminum sulfate) was used without using the polymer (B). This indicates that it is possible to obtain a water absorbent core having an excellent fluid absorbing speed, in the case where the water absorbing agent of the present invention is used in sanitary materials such as disposable diapers.

Table 4 shows that the water absorbing agents (1) and (5) have a YI value (the YI value after 7-day exposure in atmosphere at 70±1° C. and 65±1% of relative humidity) of approximately 19, which value is equivalent to that of Comparative Example (1) in which no additives are used. Thus, the water absorbing agents (1) and (5) and Comparative Example (1) are equivalent in terms of the coloring as time elapses.

The comparative water absorbing agents (3) to (5) that employ the conventional cationic macromolecular additives, i.e., Comparative Examples 3 to 5, and the comparative water absorbing agent (2) of Comparative Example 2, which water absorbing agent employs only the polyvalent metal salt additive (aluminum sulfate) without using the polymer (B), exhibited an extremely high YI value after 7-day exposure; the value was 35 or more. This indicates that the additive used in the present invention makes it possible to improve properties such as SFC value, without a reduction in the coloring resistance as time elapses.

This proves that it is possible to obtain a water absorbent core that is rarely colored even under a high temperature and high humidity, in the case where the water absorbing agent is used in sanitary materials such as disposable diapers.

Example 18

Example 1 was performed with the following changes (i) to (iii).

(i) An amount of polyethyleneglycol diacrylate was changed from 10.13 g to 5.06 g.

(ii) An amount of 1,4-butanediol was changed from 0.873 g to 0 g.

(iii) A JIS standard sieve having a mesh opening size of 710 μm was changed to that having a mesh opening size of 850 μm.

By performing the above procedure, a water absorbing resin (B) in an irregularly-pulverized shape was obtained instead of the water absorbing resin (a) in the irregularly-pulverized shape. Further, water absorbing resin particles (18D) were obtained instead of the water absorbing resin particles (1D). Furthermore, a water absorbing agent (18) was obtained instead of the water absorbing agent (1).

Example 19

Example 1 was performed with the following changes (i) and (ii):

(i) An amount of polyethyleneglycol diacrylate was changed from 10.13 g to 13.94 g.

(ii) A JIS standard sieve having a mesh opening size of 710 μm was changed to that having a mesh opening size of 600 μm.

By performing the above procedure, a water absorbing resin (C) in the irregularly-pulverized shape was obtained instead of the water absorbing resin (a) in the irregularly-pulverized shape. Further, the water absorbing resin particles (19D) were obtained instead of the water absorbing resin particles (1D). Furthermore, the water absorbing agent (19) was obtained instead of the water absorbing agent (1).

Shown in Table 5 were properties of the water absorbing resins (B) and (C). Shown in Table 6 were properties of the water absorbing resin particles (18D) and (19D). Shown in Table 7 were properties of the water absorbing agents (18) and (19).

TABLE 5

| | | CENTRIFUGAL RETENTION CAPACITY (CRC) g/g | WATER-SOLUBLE COMPONENT wt % | MASS-MEDIAN PARTICLE SIZE (D50) μm | LOG STANDARD DEVIATION OF PARTICLE-SIZE DISTRIBUTION (σζ) | RATIO OF PARTICLES PASSING THROUGH A SIEVE WITH 150 μm MESH SIZE wt % |
|---|---|---|---|---|---|---|
| EXAMPLE 18 | WATER ABSORBING RESIN (B) | 42.1 | 14.2 | 473 | 0.37 | 0.2 |

TABLE 5-continued

| | | CENTRIFUGAL RETENTION CAPACITY (CRC) g/g | WATER- SOLUBLE COMPONENT wt % | MASS-MEDIAN PARTICLE SIZE (D50) μm | LOG STANDARD DEVIATION OF PARTICLE-SIZE DISTRIBUTION (σζ) | RATIO OF PARTICLES PASSING THROUGH A SIEVE WITH 150 μm MESH SIZE wt % |
|---|---|---|---|---|---|---|
| EXAMPLE 19 | WATER ABSORBING RESIN (C) | 29.8 | 4.5 | 317 | 0.33 | 1.3 |

TABLE 6

| | | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g | FREE SWELL RATE (FSR) g/g/sec | WATER- ABSORPTION TIME (Vortex) sec |
|---|---|---|---|---|---|---|---|
| EXAMPLE 18 | WATER ABSORBING RESIN PARTICLES (18D) | 32.6 | 15 | 25.6 | 25.0 | 0.17 | 90 |
| EXAMPLE 19 | WATER ABSORBING RESIN PARTICLES (19D) | 25.4 | 70 | 23.1 | 23.0 | 0.28 | 50 |

TABLE 7

| | | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g | FREE SWELL RATE (FSR) g/g/sec | WATER- ABSORPTION TIME (Vortex) sec |
|---|---|---|---|---|---|---|---|
| EXAMPLE 18 | WATER ABSORBING AGENT (18) | 32.1 | 41 | 24.1 | 22.5 | 0.21 | 70 |
| EXAMPLE 19 | WATER ABSORBING AGENT (19) | 25.0 | 145 | 22.5 | 22.1 | 0.33 | 41 |

INDUSTRIAL APPLICABILITY

A water absorbing agent according to the present invention is excellent in a balance between a centrifugal retention capacity (CRC) that represents absorption capacity and a saline flow conductivity (SFC) that represents liquid permeability. Thus, the water absorbing agent according to the present invention can be suitably used as a water absorbing agent that has excellent fluid absorbing speed of body fluid or the like into a sanitary material (water absorbent core) such as a disposable diaper having been functionalized and made thinner.

The invention claimed is:

1. A water absorbing agent comprising:
a water absorbing resin (A); and
a polymer (B) being a polyamine polymer having a hydroxyl group on a main chain,
said water absorbing resin (A) being a cross-linked polymer of polyacrylic acid and/or a salt thereof,
said polymer (B) (i) being obtainable by reacting an amine and an epihalohydrin, which are monomers and whose amounts in total with respect to the whole amount of the polymer (B) are 100 to 60 mass %, (ii) containing dialkylamine, as the amine, whose amount respect to the whole amount of the amine is not less than 50 mol % and not more than 100 mol %, and (iii) having a weight average molecular weight of 40,000 dalton to 500,000 dalton,
the polymer (B) with respect to 100 parts by mass of the water absorbing resin (A) being 0.01 to 10 parts by mass,
said water absorbing agent having a yellowness index (YI) of not more than 30 in the Hunter's Lab color system when measured by spectral colorimeter after a 7-day exposure to an atmosphere at 70±1° C. and 65±1% relative humidity.

2. The water absorbing agent according to claim 1, wherein the polymer (B) is a polymer being obtainable by reacting an ammonia (b1), the dialkylamine, and the epihalohydrin (b3), which are monomers and essential components.

3. The water absorbing agent according to claim 1, wherein the water absorbing resin (A) has a crosslinked surface.

4. The water absorbing agent according to claim 1, the water absorbing agent containing water of 1 to 20 mass %.

5. The water absorbing agent according to claim 1, wherein said water absorbing agent is obtained by the method comprising:

mixing said water absorbing resin (A) and said polymer (B) to form said water absorbing agent.

6. The water absorbing agent according to claim 1, wherein said water absorbing agent comprises said water absorbing resin (A) as a main component.

7. The water absorbing agent according to claim 6, wherein said water absorbing resin (A) is included in an amount of at least 50 mass % to not more than 99.999 mass % based on the weight of the water absorbing agent, and said polymer (B) is included in an amount of not less than 0.001 to not more than 10 mass % based on the total amount of the water absorbing agent.

8. The water absorbing agent according to claim 1, wherein said water absorbing agent is a particulate water absorbing agent comprising a mixture of said water absorbing resin (A) and polymer (B).

9. The water absorbing agent according to claim 1, wherein the polymer (B) contains protonatable nitrogen atoms at a concentration of 4 mmol/g to 10 mmol/g.

10. The water absorbing agent according to claim 1, wherein said water absorbing agent has a saline flow conductivity (SFC) of not less than 100 $cm^3 \cdot s \cdot 10^{-7} \cdot g^{-1}$.

11. A method for producing the water absorbing agent of claim 1, the method comprising:
   mixing the water absorbing resin (A) and the polymer (B) of claim 1.

12. The method according to claim 11, wherein the polymer (B) is a polymer obtainable by reacting an ammonia (b1), the dialkyl amine (b2), and the epihalohydrin (b3), which are monomers and essential components.

* * * * *